(12) United States Patent
Hsu et al.

(10) Patent No.: US 8,149,839 B1
(45) Date of Patent: Apr. 3, 2012

(54) SELECTION OF TRUNK PORTS AND PATHS USING ROTATION

(75) Inventors: Ivy Pei-Shan Hsu, Pleasanton, CA (US); Deepak Bansal, San Jose, CA (US); Lok Yan Hui, Milpitas, CA (US); Yuen Wong, San Jose, CA (US); Vahid Naraghi, Los Gatos, CA (US)

(73) Assignee: Foundry Networks, LLC, San Jose, CA (US)

( * ) Notice: Subject to any disclaimer, the term of this patent is extended or adjusted under 35 U.S.C. 154(b) by 191 days.

(21) Appl. No.: 12/198,697

(22) Filed: Aug. 26, 2008

Related U.S. Application Data

(60) Provisional application No. 61/015,151, filed on Dec. 19, 2007, provisional application No. 61/015,153, filed on Dec. 19, 2007, provisional application No. 60/975,363, filed on Sep. 26, 2007.

(51) Int. Cl.
*H04L 12/28* (2006.01)

(52) U.S. Cl. ........................................ 370/392; 370/389

(58) Field of Classification Search .................. 370/386, 370/389, 238, 392, 230; 455/445
See application file for complete search history.

(56) References Cited

U.S. PATENT DOCUMENTS

| | | | |
|---|---|---|---|
| 3,866,175 A | 2/1975 | Seifert, Jr. et al. |
| 4,325,119 A | 4/1982 | Grandmaison et al. |
| 4,348,725 A | 9/1982 | Farrell et al. |
| 4,628,480 A | 12/1986 | Floyd |
| 4,667,323 A | 5/1987 | Engdahl et al. |
| 4,683,564 A | 7/1987 | Young et al. |
| 4,698,748 A | 10/1987 | Juzswik et al. |
| 4,723,243 A | 2/1988 | Joshi et al. |
| 4,754,482 A | 6/1988 | Weiss |
| 4,791,629 A | 12/1988 | Burns et al. |
| 4,794,629 A | 12/1988 | Pastyr et al. |
| 4,807,280 A | 2/1989 | Posner et al. |
| 4,876,681 A | 10/1989 | Hagiwara et al. |
| 4,896,277 A | 1/1990 | Vercellotti et al. |
| 4,985,889 A | 1/1991 | Frankish et al. |
| 5,101,404 A | 3/1992 | Kunimoto et al. |
| 5,136,584 A | 8/1992 | Hedlund |
| 5,195,181 A | 3/1993 | Bryant et al. |

(Continued)

FOREIGN PATENT DOCUMENTS

EP 1380127 A2 1/2004

(Continued)

OTHER PUBLICATIONS

U.S. Appl. No. 10/139,912, filed May 6, 2002, Davis et al.

(Continued)

*Primary Examiner* — Kwang B Yao
*Assistant Examiner* — Syed M Bokhari
(74) *Attorney, Agent, or Firm* — Kilpatrick Townsend & Stockton LLP

(57) ABSTRACT

Techniques that offer enhanced diversity in the selection of paths (e.g., ECMP paths) and/or ports from ports associated with trunks for forwarding network data traffic. In one embodiment, a network device uses a rotate function to generate a rotated index (path index) that is used to select a path (e.g., an ECMP) path from multiple paths (e.g., multiple ECMP paths) for forwarding a packet. A network device may also generate a rotated index (trunk index) that is used to select an output port from multiple output ports associated with a trunk for forwarding the packet.

11 Claims, 6 Drawing Sheets

U.S. PATENT DOCUMENTS

| | | | |
|---|---|---|---|
| 5,208,856 A | 5/1993 | Leduc et al. |
| 5,224,108 A | 6/1993 | McDysan et al. |
| 5,231,633 A | 7/1993 | Hluchyj et al. |
| 5,280,582 A | 1/1994 | Yang et al. |
| 5,282,196 A | 1/1994 | Clebowicz |
| 5,287,477 A | 2/1994 | Johnson et al. |
| 5,299,190 A | 3/1994 | LaMaire et al. |
| 5,299,195 A | 3/1994 | Shah |
| 5,301,192 A | 4/1994 | Henrion |
| 5,307,345 A | 4/1994 | Lozowick et al. |
| 5,323,386 A | 6/1994 | Wiher et al. |
| 5,365,512 A | 11/1994 | Combs et al. |
| 5,377,189 A | 12/1994 | Clark |
| 5,390,173 A | 2/1995 | Spinney et al. |
| 5,392,279 A | 2/1995 | Taniguchi |
| 5,406,643 A | 4/1995 | Burke et al. |
| 5,408,469 A | 4/1995 | Opher et al. |
| 5,430,442 A | 7/1995 | Kaiser et al. |
| 5,436,893 A | 7/1995 | Barnett |
| 5,461,615 A | 10/1995 | Henrion |
| 5,490,258 A | 2/1996 | Fenner |
| 5,506,840 A | 4/1996 | Pauwels et al. |
| 5,506,841 A | 4/1996 | Sandquist |
| 5,521,923 A | 5/1996 | Willmann et al. |
| 5,546,385 A | 8/1996 | Caspi et al. |
| 5,550,816 A | 8/1996 | Hardwick et al. |
| 5,563,948 A | 10/1996 | Diehl et al. |
| 5,566,170 A | 10/1996 | Bakke et al. |
| 5,598,410 A | 1/1997 | Stone |
| 5,600,795 A | 2/1997 | Du |
| 5,619,497 A | 4/1997 | Gallagher et al. |
| 5,640,504 A | 6/1997 | Johnson, Jr. |
| 5,646,878 A | 7/1997 | Samra |
| 5,663,952 A | 9/1997 | Gentry, Jr. |
| 5,663,959 A | 9/1997 | Nakagawa |
| 5,666,353 A | 9/1997 | Klausmeier et al. |
| 5,721,819 A | 2/1998 | Galles et al. |
| 5,732,080 A | 3/1998 | Ferguson et al. |
| 5,734,826 A | 3/1998 | Olnowich et al. |
| 5,740,176 A | 4/1998 | Gupta et al. |
| 5,745,708 A | 4/1998 | Weppler et al. |
| 5,751,710 A | 5/1998 | Crowther et al. |
| 5,802,287 A | 9/1998 | Rostoker et al. |
| 5,815,146 A | 9/1998 | Youden et al. |
| 5,818,816 A | 10/1998 | Chikazawa et al. |
| 5,835,496 A | 11/1998 | Yeung et al. |
| 5,838,684 A | 11/1998 | Wicki et al. |
| 5,862,350 A | 1/1999 | Coulson |
| 5,864,555 A | 1/1999 | Mathur et al. |
| 5,867,675 A | 2/1999 | Lomelino et al. |
| 5,870,538 A | 2/1999 | Manning et al. |
| 5,872,769 A | 2/1999 | Caldara et al. |
| 5,872,783 A | 2/1999 | Chin |
| 5,875,200 A | 2/1999 | Glover et al. |
| 5,896,380 A | 4/1999 | Brown et al. |
| 5,907,566 A | 5/1999 | Benson et al. |
| 5,907,660 A | 5/1999 | Inoue et al. |
| 5,909,686 A | 6/1999 | Muller et al. |
| 5,915,094 A | 6/1999 | Kouloheris et al. |
| 5,920,566 A | 7/1999 | Hendel et al. |
| 5,920,886 A | 7/1999 | Feldmeier |
| 5,936,939 A | 8/1999 | Des Jardins et al. |
| 5,936,966 A | 8/1999 | Ogawa et al. |
| 5,956,347 A | 9/1999 | Slater |
| 5,999,528 A | 12/1999 | Chow et al. |
| 6,000,016 A | 12/1999 | Curtis et al. |
| 6,011,910 A | 1/2000 | Chau et al. |
| 6,016,310 A | 1/2000 | Muller et al. |
| 6,023,471 A | 2/2000 | Haddock et al. |
| 6,031,843 A | 2/2000 | Swanbery et al. |
| 6,035,414 A | 3/2000 | Okazawa et al. |
| 6,038,288 A | 3/2000 | Thomas et al. |
| 6,067,298 A | 5/2000 | Shinohara |
| 6,067,606 A | 5/2000 | Holscher et al. |
| 6,076,115 A | 6/2000 | Sambamurthy et al. |
| 6,081,522 A | 6/2000 | Hendel et al. |
| 6,088,356 A | 7/2000 | Hendel et al. |
| 6,094,434 A | 7/2000 | Kotzur et al. |
| 6,104,696 A | 8/2000 | Kadambi et al. |
| 6,104,700 A | 8/2000 | Haddock et al. |
| 6,108,306 A | 8/2000 | Kalkunte et al. |
| 6,118,787 A | 9/2000 | Kalkunte et al. |
| 6,125,417 A | 9/2000 | Bailis et al. |
| 6,128,666 A | 10/2000 | Muller et al. |
| 6,144,668 A | 11/2000 | Bass et al. |
| 6,147,996 A | 11/2000 | Laor et al. |
| 6,151,301 A | 11/2000 | Holden |
| 6,151,497 A | 11/2000 | Yee et al. |
| 6,154,446 A | 11/2000 | Kadambi et al. |
| 6,157,643 A | 12/2000 | Ma |
| 6,160,809 A | 12/2000 | Adiletta et al. |
| 6,160,812 A | 12/2000 | Bauman et al. |
| 6,172,990 B1 | 1/2001 | Deb et al. |
| 6,178,520 B1 | 1/2001 | DeKoning et al. |
| 6,181,699 B1 | 1/2001 | Crinion et al. |
| 6,185,222 B1 | 2/2001 | Hughes |
| 6,195,335 B1 | 2/2001 | Calvignac et al. |
| 6,201,492 B1 | 3/2001 | Amar et al. |
| 6,222,845 B1 | 4/2001 | Shue et al. |
| 6,243,667 B1 | 6/2001 | Kerr et al. |
| 6,249,528 B1 | 6/2001 | Kothary |
| 6,263,374 B1 | 7/2001 | Olnowich et al. |
| 6,272,144 B1 | 8/2001 | Berenbaum et al. |
| 6,304,903 B1 | 10/2001 | Ward |
| 6,320,859 B1 | 11/2001 | Momirov |
| 6,333,929 B1 | 12/2001 | Drottar et al. |
| 6,335,932 B2 | 1/2002 | Kadambi et al. |
| 6,335,935 B2 | 1/2002 | Kadambi et al. |
| 6,343,072 B1 | 1/2002 | Bechtolsheim et al. |
| 6,351,143 B1 | 2/2002 | Guccione et al. |
| 6,356,550 B1 | 3/2002 | Williams |
| 6,356,942 B1 | 3/2002 | Bengtsson et al. |
| 6,359,879 B1 | 3/2002 | Carvey et al. |
| 6,363,077 B1 | 3/2002 | Wong et al. |
| 6,366,557 B1 | 4/2002 | Hunter |
| 6,369,855 B1 | 4/2002 | Chauvel et al. |
| 6,421,352 B1 | 7/2002 | Manaka et al. |
| 6,424,658 B1 | 7/2002 | Mathur |
| 6,424,659 B2 | 7/2002 | Viswanadham et al. |
| 6,427,185 B1 | 7/2002 | Ryals et al. |
| 6,430,190 B1 | 8/2002 | Essbaum et al. |
| 6,457,175 B1 | 9/2002 | Lerche |
| 6,459,705 B1 | 10/2002 | Cheng |
| 6,460,088 B1 | 10/2002 | Merchant |
| 6,463,063 B1 | 10/2002 | Bianchini, Jr. et al. |
| 6,466,608 B1 | 10/2002 | Hong et al. |
| 6,470,436 B1 | 10/2002 | Croft et al. |
| 6,473,428 B1 | 10/2002 | Nichols et al. |
| 6,473,433 B1 | 10/2002 | Bianchini, Jr. et al. |
| 6,477,174 B1 | 11/2002 | Dooley et al. |
| 6,480,477 B1 | 11/2002 | Treadaway et al. |
| 6,490,280 B1 | 12/2002 | Leung |
| 6,493,347 B2 | 12/2002 | Sindhu et al. |
| 6,496,502 B1 | 12/2002 | Fite et al. |
| 6,505,281 B1 | 1/2003 | Sherry |
| 6,510,138 B1 | 1/2003 | Pannell |
| 6,522,656 B1 | 2/2003 | Gridley |
| 6,532,229 B1 | 3/2003 | Johnson et al. |
| 6,532,234 B1 | 3/2003 | Yoshikawa et al. |
| 6,535,504 B1 | 3/2003 | Johnson et al. |
| 6,549,519 B1 | 4/2003 | Michels et al. |
| 6,553,370 B1 | 4/2003 | Andreev et al. |
| 6,556,208 B1 | 4/2003 | Congdon et al. |
| 6,567,404 B1 | 5/2003 | Wilford |
| 6,570,884 B1 | 5/2003 | Connery et al. |
| 6,577,631 B1 | 6/2003 | Keenan et al. |
| 6,587,432 B1 | 7/2003 | Putzolu et al. |
| 6,591,302 B2 | 7/2003 | Boucher et al. |
| 6,601,186 B1 | 7/2003 | Fox et al. |
| 6,606,300 B1 | 8/2003 | Blanc et al. |
| 6,628,650 B1 | 9/2003 | Saite et al. |
| 6,633,580 B1 | 10/2003 | Torudbakken et al. |
| 6,636,483 B1 | 10/2003 | Pannell |
| 6,643,269 B1 | 11/2003 | Fan et al. |
| 6,654,342 B1 | 11/2003 | Dittia et al. |
| 6,654,346 B1 | 11/2003 | Mahalingaiah et al. |
| 6,654,370 B1 | 11/2003 | Quirke et al. |

| | | |
|---|---|---|
| 6,654,373 B1 | 11/2003 | Maher, III et al. |
| 6,658,002 B1 | 12/2003 | Ross et al. |
| 6,661,791 B1 | 12/2003 | Brown |
| 6,671,275 B1 | 12/2003 | Wong et al. |
| 6,678,248 B1 | 1/2004 | Haddock et al. |
| 6,681,332 B1 | 1/2004 | Byrne et al. |
| 6,683,872 B1 | 1/2004 | Saito |
| 6,687,217 B1 | 2/2004 | Chow et al. |
| 6,687,247 B1 | 2/2004 | Wilford et al. |
| 6,691,202 B2 | 2/2004 | Vasquez et al. |
| 6,696,917 B1 | 2/2004 | Heitner et al. |
| 6,697,359 B1 | 2/2004 | George |
| 6,697,368 B2 | 2/2004 | Chang et al. |
| 6,700,894 B1 | 3/2004 | Shung |
| 6,708,000 B1 | 3/2004 | Nishi et al. |
| 6,721,229 B1 | 4/2004 | Cole |
| 6,721,268 B1 | 4/2004 | Ohira et al. |
| 6,721,313 B1 | 4/2004 | Van Duyne |
| 6,721,338 B1 | 4/2004 | Sato |
| 6,731,875 B1 | 5/2004 | Kartalopoulos |
| 6,735,218 B2 | 5/2004 | Chang et al. |
| 6,745,277 B1 | 6/2004 | Lee et al. |
| 6,747,971 B1 | 6/2004 | Hughes et al. |
| 6,751,224 B1 | 6/2004 | Parruck et al. |
| 6,754,881 B2 | 6/2004 | Kuhlmann et al. |
| 6,765,866 B1 | 7/2004 | Wyatt |
| 6,775,706 B1 | 8/2004 | Fukumoto et al. |
| 6,778,546 B1 | 8/2004 | Epps et al. |
| 6,781,990 B1 | 8/2004 | Puri et al. |
| 6,785,290 B1 | 8/2004 | Fujisawa et al. |
| 6,788,697 B1 | 9/2004 | Aweya et al. |
| 6,792,484 B1 | 9/2004 | Hook |
| 6,792,502 B1 | 9/2004 | Pandya et al. |
| 6,798,740 B1 | 9/2004 | Senevirathne et al. |
| 6,804,220 B2 | 10/2004 | Odenwalder et al. |
| 6,804,731 B1 | 10/2004 | Chang et al. |
| 6,807,179 B1 | 10/2004 | Kanuri et al. |
| 6,807,363 B1 | 10/2004 | Abiko et al. |
| 6,810,038 B1 | 10/2004 | Isoyama et al. |
| 6,810,046 B2 | 10/2004 | Abbas et al. |
| 6,813,243 B1 | 11/2004 | Epps et al. |
| 6,813,266 B1 | 11/2004 | Chiang et al. |
| 6,816,467 B1 | 11/2004 | Muller et al. |
| 6,831,923 B1 | 12/2004 | Laor et al. |
| 6,831,932 B1 | 12/2004 | Boyle et al. |
| 6,836,808 B2 | 12/2004 | Bunce et al. |
| 6,839,346 B1 | 1/2005 | Kametani |
| 6,842,422 B1 | 1/2005 | Bianchini |
| 6,854,117 B1 | 2/2005 | Roberts |
| 6,856,600 B1 | 2/2005 | Russell et al. |
| 6,859,438 B2 | 2/2005 | Haddock et al. |
| 6,865,153 B1 | 3/2005 | Hill et al. |
| 6,901,072 B1 | 5/2005 | Wong |
| 6,906,936 B1 | 6/2005 | James et al. |
| 6,912,637 B1 | 6/2005 | Herbst |
| 6,920,154 B1 | 7/2005 | Achler |
| 6,925,516 B2 | 8/2005 | Struhsaker et al. |
| 6,934,305 B1 | 8/2005 | Duschatko et al. |
| 6,937,606 B2 | 8/2005 | Basso et al. |
| 6,946,948 B2 | 9/2005 | McCormack et al. |
| 6,957,258 B2 | 10/2005 | Maher, III et al. |
| 6,959,007 B1 | 10/2005 | Vogel et al. |
| 6,973,092 B1 | 12/2005 | Zhou et al. |
| 6,975,599 B1 | 12/2005 | Johnson et al. |
| 6,978,309 B1 | 12/2005 | Dorbolo |
| 6,980,552 B1 | 12/2005 | Belz et al. |
| 6,982,974 B1 | 1/2006 | Saleh et al. |
| 6,990,102 B1 | 1/2006 | Kaniz et al. |
| 6,993,032 B1 | 1/2006 | Dammann et al. |
| 6,996,663 B1 | 2/2006 | Marsteiner |
| 7,005,812 B2 | 2/2006 | Mitchell |
| 7,009,968 B2 | 3/2006 | Ambe et al. |
| 7,012,919 B1 | 3/2006 | So et al. |
| 7,050,430 B2 | 5/2006 | Kalkunte et al. |
| 7,080,238 B2 | 7/2006 | Van Hoof et al. |
| 7,082,133 B1 | 7/2006 | Lor et al. |
| 7,103,041 B1 | 9/2006 | Speiser et al. |
| 7,120,744 B2 | 10/2006 | Klein |
| 7,126,948 B2 * | 10/2006 | Gooch et al. .................. 370/392 |
| 7,126,956 B2 | 10/2006 | Scholten |
| 7,151,797 B2 | 12/2006 | Limberg |
| 7,167,471 B2 | 1/2007 | Calvignac et al. |
| 7,176,911 B1 | 2/2007 | Kidono et al. |
| 7,185,141 B1 | 2/2007 | James et al. |
| 7,185,266 B2 | 2/2007 | Blightman et al. |
| 7,187,687 B1 | 3/2007 | Davis et al. |
| 7,190,696 B1 * | 3/2007 | Manur et al. .................. 370/392 |
| 7,191,277 B2 | 3/2007 | Broyles |
| 7,191,468 B2 | 3/2007 | Hanner |
| 7,203,194 B2 | 4/2007 | Chang et al. |
| 7,206,283 B2 | 4/2007 | Chang et al. |
| 7,212,536 B2 | 5/2007 | Mackiewich et al. |
| 7,218,637 B1 | 5/2007 | Best et al. |
| 7,219,293 B2 | 5/2007 | Tsai et al. |
| 7,228,509 B1 | 6/2007 | Dada et al. |
| 7,237,058 B2 | 6/2007 | Srinivasan |
| 7,249,306 B2 | 7/2007 | Chen |
| 7,266,117 B1 | 9/2007 | Davis |
| 7,272,611 B1 | 9/2007 | Cuppett et al. |
| 7,272,613 B2 | 9/2007 | Sim et al. |
| 7,277,425 B1 | 10/2007 | Sikdar |
| 7,283,547 B1 | 10/2007 | Hook et al. |
| 7,286,534 B2 | 10/2007 | Kloth |
| 7,324,509 B2 | 1/2008 | Ni |
| 7,355,970 B2 | 4/2008 | Lor |
| 7,356,030 B2 | 4/2008 | Chang et al. |
| 7,366,100 B2 | 4/2008 | Anderson et al. |
| 7,391,769 B2 | 6/2008 | Rajkumar et al. |
| 7,428,693 B2 | 9/2008 | Obuchi et al. |
| 7,468,975 B1 | 12/2008 | Davis |
| 7,512,127 B2 | 3/2009 | Chang et al. |
| 7,558,193 B2 | 7/2009 | Bradbury et al. |
| 7,561,590 B1 | 7/2009 | Walsh |
| 7,596,139 B2 | 9/2009 | Patel et al. |
| 7,609,617 B2 | 10/2009 | Appanna et al. |
| 7,613,991 B1 | 11/2009 | Bain |
| 7,636,369 B2 | 12/2009 | Wong |
| 7,649,885 B1 | 1/2010 | Davis |
| 7,657,703 B1 | 2/2010 | Singh |
| 7,738,450 B1 | 6/2010 | Davis |
| 7,813,367 B2 | 10/2010 | Wong |
| 7,830,884 B2 | 11/2010 | Davis |
| 7,903,654 B2 | 3/2011 | Bansal |
| 7,933,947 B2 | 4/2011 | Fleischer et al. |
| 7,948,872 B2 | 5/2011 | Patel et al. |
| 7,953,922 B2 | 5/2011 | Singh |
| 7,953,923 B2 | 5/2011 | Singh |
| 8,014,278 B1 | 9/2011 | Subramanian et al. |
| 8,037,399 B2 | 10/2011 | Wong et al. |
| 2001/0001879 A1 | 5/2001 | Kubik et al. |
| 2001/0007560 A1 | 7/2001 | Masuda et al. |
| 2001/0026551 A1 | 10/2001 | Horlin |
| 2001/0048785 A1 | 12/2001 | Steinberg |
| 2001/0053150 A1 | 12/2001 | Clear et al. |
| 2002/0001307 A1 | 1/2002 | Nguyen et al. |
| 2002/0012585 A1 | 1/2002 | Kalkunte et al. |
| 2002/0040417 A1 | 4/2002 | Winograd et al. |
| 2002/0054594 A1 | 5/2002 | Hoof et al. |
| 2002/0054595 A1 | 5/2002 | Ambe et al. |
| 2002/0069294 A1 | 6/2002 | Herkersdorf et al. |
| 2002/0073073 A1 | 6/2002 | Cheng |
| 2002/0085499 A1 | 7/2002 | Toyoyama et al. |
| 2002/0087788 A1 | 7/2002 | Morris |
| 2002/0089937 A1 | 7/2002 | Venkatachary et al. |
| 2002/0089977 A1 | 7/2002 | Chang et al. |
| 2002/0091844 A1 | 7/2002 | Craft et al. |
| 2002/0091884 A1 | 7/2002 | Chang et al. |
| 2002/0097713 A1 | 7/2002 | Chang et al. |
| 2002/0105966 A1 | 8/2002 | Patel et al. |
| 2002/0126672 A1 | 9/2002 | Chow et al. |
| 2002/0131437 A1 | 9/2002 | Tagore-Brage |
| 2002/0141403 A1 * | 10/2002 | Akahane et al. .................. 370/389 |
| 2002/0146013 A1 | 10/2002 | Karlsson et al. |
| 2002/0161967 A1 | 10/2002 | Kirihata et al. |
| 2002/0169786 A1 | 11/2002 | Richek |
| 2002/0191605 A1 | 12/2002 | Van Lunteren et al. |
| 2003/0009466 A1 | 1/2003 | Ta et al. |
| 2003/0012198 A1 | 1/2003 | Kaganoi et al. |

| | | | |
|---|---|---|---|
| 2003/0033435 A1 | 2/2003 | Hanner | |
| 2003/0043800 A1 | 3/2003 | Sonksen et al. | |
| 2003/0043848 A1 | 3/2003 | Sonksen | |
| 2003/0048785 A1 | 3/2003 | Calvignac et al. | |
| 2003/0061459 A1 | 3/2003 | Aboulenein et al. | |
| 2003/0074657 A1 | 4/2003 | Bramley, Jr. | |
| 2003/0081608 A1 | 5/2003 | Barri et al. | |
| 2003/0095548 A1 | 5/2003 | Yamano | |
| 2003/0103499 A1 | 6/2003 | Davis et al. | |
| 2003/0103500 A1 | 6/2003 | Menon et al. | |
| 2003/0108052 A1 | 6/2003 | Inoue et al. | |
| 2003/0110180 A1 | 6/2003 | Calvignac et al. | |
| 2003/0115403 A1 | 6/2003 | Bouchard et al. | |
| 2003/0120861 A1 | 6/2003 | Calle et al. | |
| 2003/0128668 A1 | 7/2003 | Yavatkar et al. | |
| 2003/0137978 A1* | 7/2003 | Kanetake | 370/386 |
| 2003/0152084 A1 | 8/2003 | Lee et al. | |
| 2003/0152096 A1 | 8/2003 | Chapman | |
| 2003/0156586 A1 | 8/2003 | Lee et al. | |
| 2003/0159086 A1 | 8/2003 | Arndt | |
| 2003/0165160 A1 | 9/2003 | Minami et al. | |
| 2003/0169470 A1 | 9/2003 | Alagar et al. | |
| 2003/0174719 A1 | 9/2003 | Sampath et al. | |
| 2003/0177221 A1 | 9/2003 | Ould-Brahim et al. | |
| 2003/0198182 A1 | 10/2003 | Pegrum et al. | |
| 2003/0200343 A1 | 10/2003 | Greenblat et al. | |
| 2003/0214956 A1 | 11/2003 | Navada et al. | |
| 2003/0215029 A1 | 11/2003 | Limberg | |
| 2003/0223424 A1 | 12/2003 | Anderson et al. | |
| 2003/0223466 A1 | 12/2003 | Noronha, Jr. et al. | |
| 2003/0227943 A1 | 12/2003 | Hallman et al. | |
| 2004/0022263 A1 | 2/2004 | Zhao et al. | |
| 2004/0028060 A1 | 2/2004 | Kang | |
| 2004/0054867 A1 | 3/2004 | Stravers et al. | |
| 2004/0062245 A1 | 4/2004 | Sharp et al. | |
| 2004/0062246 A1 | 4/2004 | Boucher et al. | |
| 2004/0088469 A1 | 5/2004 | Levy | |
| 2004/0128434 A1 | 7/2004 | Khanna et al. | |
| 2004/0141504 A1 | 7/2004 | Blanc | |
| 2004/0190547 A1 | 9/2004 | Gordy et al. | |
| 2004/0208177 A1 | 10/2004 | Ogawa | |
| 2004/0208181 A1 | 10/2004 | Clayton et al. | |
| 2004/0223502 A1 | 11/2004 | Wybenga et al. | |
| 2004/0235480 A1* | 11/2004 | Rezaaifar et al. | 455/445 |
| 2004/0264380 A1* | 12/2004 | Kalkunte et al. | 370/238 |
| 2005/0010630 A1 | 1/2005 | Doering et al. | |
| 2005/0010849 A1 | 1/2005 | Ryle et al. | |
| 2005/0041684 A1 | 2/2005 | Reynolds et al. | |
| 2005/0097432 A1 | 5/2005 | Obuchi et al. | |
| 2005/0120122 A1 | 6/2005 | Farnham | |
| 2005/0132132 A1 | 6/2005 | Rosenbluth et al. | |
| 2005/0132179 A1 | 6/2005 | Glaum et al. | |
| 2005/0138276 A1 | 6/2005 | Navada et al. | |
| 2005/0144369 A1 | 6/2005 | Jaspers | |
| 2005/0152324 A1 | 7/2005 | Benveniste | |
| 2005/0152335 A1 | 7/2005 | Lodha et al. | |
| 2005/0169317 A1 | 8/2005 | Prueckelmayer | |
| 2005/0175018 A1 | 8/2005 | Wong | |
| 2005/0185577 A1 | 8/2005 | Sakamoto et al. | |
| 2005/0185652 A1 | 8/2005 | Iwamoto | |
| 2005/0193316 A1 | 9/2005 | Chen | |
| 2005/0201387 A1 | 9/2005 | Willis | |
| 2005/0226236 A1 | 10/2005 | Klink | |
| 2005/0246508 A1 | 11/2005 | Shaw | |
| 2005/0249124 A1 | 11/2005 | Elie-Dit-Cosaque et al. | |
| 2006/0031610 A1 | 2/2006 | Liav et al. | |
| 2006/0034452 A1 | 2/2006 | Tonomura | |
| 2006/0050690 A1 | 3/2006 | Epps et al. | |
| 2006/0077891 A1 | 4/2006 | Smith et al. | |
| 2006/0092829 A1 | 5/2006 | Brolin et al. | |
| 2006/0092929 A1 | 5/2006 | Chun | |
| 2006/0114876 A1 | 6/2006 | Kalkunte | |
| 2006/0146374 A1 | 7/2006 | Ng et al. | |
| 2006/0165089 A1 | 7/2006 | Klink | |
| 2006/0209685 A1 | 9/2006 | Rahman et al. | |
| 2006/0221841 A1 | 10/2006 | Lee et al. | |
| 2006/0268680 A1 | 11/2006 | Roberts et al. | |
| 2007/0038798 A1 | 2/2007 | Bouchard et al. | |
| 2007/0088974 A1 | 4/2007 | Chandwani et al. | |
| 2007/0127464 A1 | 6/2007 | Jain et al. | |
| 2007/0179909 A1 | 8/2007 | Channasagara | |
| 2007/0208876 A1 | 9/2007 | Davis | |
| 2007/0253420 A1 | 11/2007 | Chang et al. | |
| 2007/0258475 A1 | 11/2007 | Chinn et al. | |
| 2007/0288690 A1 | 12/2007 | Wang et al. | |
| 2008/0002707 A1 | 1/2008 | Davis | |
| 2008/0031263 A1 | 2/2008 | Ervin et al. | |
| 2008/0037544 A1 | 2/2008 | Yano et al. | |
| 2008/0049742 A1 | 2/2008 | Bansal et al. | |
| 2008/0069125 A1 | 3/2008 | Reed et al. | |
| 2008/0092020 A1 | 4/2008 | Hasenplaugh et al. | |
| 2008/0095169 A1 | 4/2008 | Chandra et al. | |
| 2008/0117075 A1 | 5/2008 | Seddigh et al. | |
| 2008/0181103 A1* | 7/2008 | Davies | 370/230 |
| 2008/0205407 A1 | 8/2008 | Chang et al. | |
| 2008/0307288 A1 | 12/2008 | Ziesler et al. | |
| 2009/0175178 A1 | 7/2009 | Yoon et al. | |
| 2009/0279423 A1 | 11/2009 | Suresh et al. | |
| 2009/0279440 A1 | 11/2009 | Wong et al. | |
| 2009/0279441 A1 | 11/2009 | Wong et al. | |
| 2009/0279541 A1 | 11/2009 | Wong et al. | |
| 2009/0279542 A1 | 11/2009 | Wong et al. | |
| 2009/0279546 A1 | 11/2009 | Davis | |
| 2009/0279548 A1 | 11/2009 | Davis et al. | |
| 2009/0279549 A1 | 11/2009 | Ramanathan et al. | |
| 2009/0279558 A1 | 11/2009 | Davis et al. | |
| 2009/0279559 A1 | 11/2009 | Wong et al. | |
| 2009/0279561 A1 | 11/2009 | Chang et al. | |
| 2009/0282148 A1 | 11/2009 | Wong et al. | |
| 2009/0282322 A1 | 11/2009 | Wong et al. | |
| 2009/0287952 A1 | 11/2009 | Patel et al. | |
| 2009/0290499 A1 | 11/2009 | Patel et al. | |
| 2010/0034215 A1 | 2/2010 | Patel et al. | |
| 2010/0046521 A1 | 2/2010 | Wong | |
| 2010/0061393 A1 | 3/2010 | Wong | |
| 2010/0100671 A1 | 4/2010 | Singh | |
| 2010/0135313 A1 | 6/2010 | Davis | |
| 2010/0161894 A1 | 6/2010 | Singh | |
| 2010/0246588 A1 | 9/2010 | Davis | |
| 2010/0293327 A1 | 11/2010 | Lin et al. | |
| 2011/0002340 A1 | 1/2011 | Davis | |
| 2011/0044340 A1 | 2/2011 | Bansal et al. | |
| 2011/0069711 A1 | 3/2011 | Jha et al. | |
| 2011/0110237 A1 | 5/2011 | Wong et al. | |

FOREIGN PATENT DOCUMENTS

| | | |
|---|---|---|
| JP | 2003/289359 A | 10/2003 |
| JP | 2004-537871 A | 12/2004 |
| WO | WO 01/84728 A1 | 11/2001 |
| WO | WO 02/41544 A2 | 5/2002 |

OTHER PUBLICATIONS

U.S. Appl. No. 10/140,749, filed May 6, 2002, Davis et al.
U.S. Appl. No. 10/140,751, filed May 6, 2002, Davis.
U.S. Appl. No. 10/140,753, filed May 6, 2002, Davis et al.
U.S. Appl. No. 10/141,223, filed May 7, 2002, Veerabadran et al.
U.S. Appl. No. 10/810,208, filed Mar. 26, 2004, Wong et al.
U.S. Appl. No. 10/832,086, filed Apr. 26, 2004, Wong.
U.S. Appl. No. 11/118,697, filed Apr. 28, 2005, Singh.
U.S. Appl. No. 11/586,991, filed Oct. 25, 2006, Ramanathan et al.
U.S. Appl. No. 11/646,845, filed Dec. 27, 2006, Ramanathan et al.
U.S. Appl. No. 11/621,038, filed Jan. 8, 2007, Davis.
U.S. Appl. No. 11/724,965.
U.S. Appl. No. 11/779,714, filed Jul. 18, 2007, Wong et al.
U.S. Appl. No. 11/779,778, filed Jul. 18, 2007, Wong et al.
U.S. Appl. No. 11/828,246, filed Jul. 25, 2007, Davis.
U.S. Appl. No. 11/831,950, filed Jul. 31, 2007, Suresh et al.
U.S. Appl. No. 11/953,742, filed Dec. 10, 2007, Wong et al.
U.S. Appl. No. 11/953,743, filed Dec. 10, 2007, Wong et al.
U.S. Appl. No. 11/953,745, filed Dec. 10, 2007, Wong et al.
10 Gigabit Ethernet—Technology Overview White Paper, Sep. 2001, 16 pages.
10 Gigabit Ethernet Alliance, Interconnection with Wide Area Networks, Version 1.0, Mar. 2002, 6 pages.
U.S. Appl. No. 11/953,751, filed Dec. 10, 2007, Wong et al.

U.S. Appl. No. 12/372,390, filed Feb. 17, 2009, Chang et al.
U.S. Appl. No. 12/400,594, filed Mar. 9, 2009, Patel et al.
U.S. Appl. No. 12/400,645, filed Mar. 9, 2009, Patel et al.
U.S. Appl. No. 12/417,913, filed Apr. 3, 2009, Patel et al.
"17×17 3.2 Gbps Crosspoint Switch with Input Equalization—M21110," Feb. 1, 2001, 2 pages, Mindspeed—A Conexant Business.
Belhadj et al., "Feasibility of a 100GE MAC," PowerPoint Presentation, IEEE Meeting Nov. 2006, Nov. 13-15, 2006, 18 pages.
BigIron Architecture Technical Brief, Dec. 1998, 14 pages, Version 1.03, Foundry Networks.
BigIron Architecture Technical Brief, Jul. 2001, 16 pages, Version 2.02, Foundry Networks.
BigIron Architecture Technical Brief, May 1999, 15 pages, Version 2.0, Foundry Networks.
BigIron Architecture Technical Brief, May 1999, 15 pages, Version 2.01, Foundry Networks.
BigIron Architecture Technical Brief, Oct. 1998, 15 pages, Version 1.0, Foundry Networks.
BigIron Architecture Technical Brief, Oct. 1998, 15 pages, Version 1.02, Foundry Networks.
Braun et al., "Fast incremental CRC updates for IP over ATM networks," IEEE Workshop on High Performance Switching and Routing, 2001, 6 pages.
Degermark, et al., "Small Forwarding Tables for Fast Routing Lookups," ACM Computer Communications Review, Oct. 1997, 12 pages, vol. 27, No. 4.
"Foundry Networks, Inc.—BigIron 4000, Layer 2 & Layer 3 Interoperability Evaluation," Oct. 1999, 4 pages, No. 199133, The Tolly Group.
"Foundry Networks, Inc.—BigIron 8000 Gigabit Ethernet Switching Router, Layer 2 & Layer 3 Performance Evaluation," May 1999, 4 pages, No. 199111, The Tolly Group.
"Foundry Networks, Next Generation Terabit System Architecture—The High Performance Revolution for 10 Gigabit Networks," Nov. 17, 2003, 27 pages.
"Gigabit Ethernet Alliance, Accelerating the Standard for Speed," 1998, 19 pages, Gigabit Ethernet Alliance.
"IEEE Standard for Information technology—Telecommunications and information exchange between systems—Local and metropolitan area network—common specifications. Part 3: Media Access Control (MAC) Bridges," ANSI/IEEE Standard 802.1D, 1998, p. 373, 1998 Edition, IEEE.
International Preliminary Examination Report for Application No. PCT/US2001/043113, mailed Oct. 21, 2003, 6 pages.
International Search Report of the International Searching Authority for Application No. PCT/US2001/043113, mailed Dec. 13, 2002, 2 pages.
International Search Report of the International Searching Authority for Application No. PCT/US03/08719, mailed Jun. 17, 2003. 1 page.
"JetCore™ Based Chassis Systems—An Architecture Brief on NetIron, BigIron, and FastIron Systems," IronClad Network Performance, Jan. 17, 2003, 27 pages, Foundry Networks, Inc.
Kichorowsky, et al., "Mindspeed Switch Fabric Offers the Most Comprehensive Solution for Multi-Protocol Networking Equipment," Apr. 30, 2001, 3 pages.
Matsumoto, et al., "Switch Fabrics Touted at Interconnects Conference," Aug. 21, 2000, 2 pages, at URL: http://www.eetimes.com/story/OEG20000821S0011, printed on Aug. 12, 2002.
McAuley, et al., "Fast Routing Table Lookup Using CAMs," Proceedings of INFOCOM, Mar.-Apr. 1993, pp. 1382-1391.
Mier Communications, Inc., "Lab Testing Summary Report—Product Category: Layer-3 Switches, Vendor Tested:, Product Tested: Foundry Networks, BigIron 4000," Report No. 231198, Oct. 1998, 6 pages.
Mier Communications, Inc., "Lab Testing Summary Report—Product Category: Gigabit Backbone Switches, Vendor Tested: Foundry Networks, Product Tested: BigIron 4000," Report No. 210998, Sep. 1998, 6 pages.
Newton, Newton's Telecom Dictionary, Mar. 2004, p. 617, 20th Ed., CMP Books.
Satran et al., "Out of Order Incremental CRC Computation," IEEE Transactions on Computers, Feb. 23, 2003, 11 pages, vol. 54, issue 9.

Spurgeon, "Éthernet, The Definitive Guide," O'Reilly & Associates, Inc., Sebastapol, CA, Feb. 2000.
"Switch Fabric Chipset—CX27300 iScale.TM.," Apr. 30, 2001, 2 pages, Mindspeed—A Conexant Business.
Written Opinion of the International Searching Authority for Application No. PCT/US2001/043113, mailed May 1, 2003, 6 pages.
Non-Final Office Action for U.S. Appl. No. 09/855,024, mailed Jun. 4, 2002, 10 pages.
Final Office Action for U.S. Appl. No. 09/855,024, mailed Jan. 15, 2003, 20 pages.
Advisory Action for U.S. Appl. No. 09/855,024, mailed May 2, 2003.
Notice of Allowance for U.S. Appl. No. 09/855,024, mailed Nov. 3, 2003.
Notice of Allowance for U.S. Appl. No. 09/855,024, mailed Dec. 15, 2003, 6 pages.
Non-Final Office Action for U.S. Appl. No. 10/810,301, mailed Mar. 17, 2005, 11 pages.
Non-Final Office Action for U.S. Appl. No. 10/810,301, mailed Feb. 16, 2006, 12 pages.
Notice of Allowance for U.S. Appl. No. 10/810,301, mailed Jul. 28, 2006, 5 pages.
Notice of Allowance for U.S. Appl. No. 10/810,301, mailed Feb. 6, 2007, 9 pages.
Non-Final Office Action for U.S. Appl. No. 09/855,025, mailed Nov. 23, 2004, 17 pages.
Non-Final Office Action for U.S. Appl. No. 09/855,031, mailed May 22, 2002.
Non-Final Office Action for U.S. Appl. No. 09/855,031, mailed Dec. 10, 2002.
Final Office Action for U.S. Appl. No. 09/855,031, mailed Jul. 30, 2003.
Notice of Allowance for U.S. Appl. No. 09/855,031, mailed Nov. 4, 2003.
Non-Final Office Action for U.S. Appl. No. 10/736,680, mailed Feb. 16, 2006, 18 pages.
Final Office Action for U.S. Appl. No. 10/736,680, mailed Aug. 3, 2006, 10 pages.
Notice of Allowance for U.S. Appl. No. 10/736,680, mailed Feb. 22, 2007, 12 pages.
Non-Final Office Action for U.S. Appl. No. 10/210,041, mailed Sep. 10, 2003, 12 pages.
Final Office Action for U.S. Appl. No. 10/210,041, mailed Jan. 7, 2004, 14 pages.
Non-Final Office Action for U.S. Appl. No. 10/210,041, mailed Mar. 11, 2004, 12 pages.
Final Office Action for U.S. Appl. No. 10/210,041, mailed Jul. 7, 2004, 13 pages.
Non-Final Office Action for U.S. Appl. No. 10/210,041, mailed Feb. 9, 2005, 7 pages.
Final Office Action for U.S. Appl. No. 10/210,041, mailed Aug. 24, 2005, 7 pages.
Advisory Action for U.S. Appl. No. 10/210,041, mailed Dec. 13, 2005, 4 pages.
Non-Final Office Action for U.S. Appl. No. 10/210,108, mailed Jun. 12, 2003, 6 pages.
Notice of Allowance for U.S. Appl. No. 10/210,108, mailed Oct. 7, 2003.
Requirement for Restriction/Election for U.S. Appl. No. 10/438,545, mailed Oct. 31, 2003.
Non-Final Office Action for U.S. Appl. No. 10/438,545, mailed Dec. 12, 2003, 7 pages.
Notice of Allowance for U.S. Appl. No. 10/438,545, mailed Jun. 15, 2004, 4 pages.
Non-Final Office Action for U.S. Appl. No. 10/832,086, mailed Sep. 19, 2007, 12 pages.
Final Office Action for U.S. Appl. No. 10/832,086, mailed May 1, 2008, 31 pages.
Advisory Action for U.S. Appl. No. 10/832,086, mailed Jul. 21, 2008, 4 pages.
Non-Final Office Action for U.S. Appl. No. 10/832,086, mailed Sep. 18, 2008, 18 pages.
Non Final Office Action for U.S. Appl. No. 10/832,086, mailed Apr. 1, 2009, 17 pages.

Non-Final Office Action for U.S. Appl. No. 11/586,991, mailed Oct. 2, 2008, 23 pages.
Non-Final Office Action for U.S. Appl. No. 11/831,950, mailed Aug. 18, 2009, 49 pages.
Non-Final Office Action for U.S. Appl. No. 11/779,714, mailed Sep. 1, 2009, 58 pages.
Non-Final Office Action for U.S. Appl. No. 10/810,208, mailed Jul. 16, 2007, 24 pages.
Non-Final Office Action for U.S. Appl. No. 10/810,208, mailed Dec. 18, 2007, 40 pages.
Final Office Action for U.S. Appl. No. 10/810,208, mailed Jun. 11, 2008, 34 pages.
Advisory Action for U.S. Appl. No. 10/810,208, mailed Aug. 27, 2008, 4 pages.
Non-Final Office Action for U.S. Appl. No. 10/810,208, mailed Feb. 13, 2009, 17 pages.
Non-Final Office Action for U.S. Appl. No. 10/810,208, mailed Aug. 24, 2009, 38 pages.
Requirement for Restriction/Election for U.S. Appl. No. 10/140,752, mailed May 18, 2006, 8 pages.
Non-Final Office Action for U.S. Appl. No. 10/140,752, mailed Dec. 14, 2006, 17 pages.
Non-Final Office Action for U.S. Appl. No. 10/140,752, mailed Apr. 23, 2007, 6 pages.
Non-Final Office Action for U.S. Appl. No. 10/140,752, mailed Jan. 24, 2008, 8 pages.
Notice of Allowance of U.S. Appl. No. 10/140,752, mailed Jul. 24, 2008, 14 pages.
Notice of Allowance of U.S. Appl. No. 10/140,752, mailed Sep. 10, 2008, 4 pages.
Non-Final Office Action for U.S. Appl. No. 11/668,322, dated Mar. 23, 2009, 19 pages.
Non-Final Office Action for U.S. Appl. No. 11/854,486, mailed Jul. 20, 2009, 29 pages.
Non-Final Office Action for U.S. Appl. No. 10/139,912, mailed Jan. 25, 2006, 14 pages.
Final Office Action for U.S. Appl. No. 10/139,912, mailed Aug. 11, 2006, 26 pages.
Non-Final Office Action for U.S. Appl. No. 10/139,912, mailed Apr. 20, 2007, 20 pages.
Final Office Action for U.S. Appl. No. 10/139,912, mailed Nov. 28, 2007, 20 pages.
Non-Final Office Action for U.S. Appl. No. 10/139,912, mailed Aug. 1, 2008, 21 pages.
Notice of Allowance for U.S. Appl. No. 10/139,912, mailed Feb. 5, 2009, 8 pages.
Notice of Allowance for U.S. Appl. No. 10/139,912, mailed Jun. 8, 2009, 8 pages.
Requirement for Restriction/Election for U.S. Appl. No. 10/140,751, mailed Apr. 27, 2006, 5 pages.
Non-Final Office Action for U.S. Appl. No. 10/140,751, mailed Aug. 10, 2006, 15 pages.
Final Office Action for U.S. Appl. No. 10/140,751, mailed Apr. 10, 2007, 16 pages.
Non-Final Office Action for U.S. Appl. No. 10/140,751, mailed Oct. 30, 2007, 14 pages.
Final Office Action for U.S. Appl. No. 10/140,751, mailed May 28, 2008, 19 pages.
Non-Final Office Action for U.S. Appl. No. 10/140,751, mailed Sep. 17, 2008, 15 pages.
Final Office Action for U.S. Appl. No. 10/140,751, mailed Mar. 17, 2009, 17 pages.
Advisory Action for U.S. Appl. No. 10/140,751, mailed Jun. 1, 2009, 3 pages.
Non-Final Office Action for U.S. Appl. No. 11/745,008, mailed May 14, 2009, 27 pages.
Non-Final Office Action for U.S. Appl. No. 10/141,223, mailed Feb. 23, 2006, 25 pages.
Non-Final Office Action for U.S. Appl. No. 10/141,223, mailed Feb. 13, 2007, 29 pages.
Final Office Action for U.S. Appl. No. 10/141,223, mailed Aug. 21, 2007, 25 pages.
Non-Final Office Action for U.S. Appl. No. 10/141,223, mailed Dec. 28, 2007, 13 pages.
Non-Final Office Action for U.S. Appl. No. 10/141,223, mailed Sep. 3, 2008, 22 pages.
Non-Final Office Action for U.S. Appl. No. 10/139,831, mailed Oct. 17, 2005, 7 pages.
Notice of Allowance for U.S. Appl. No. 10/139,831, mailed Feb. 9, 2006, 7 pages.
Non-Final Office Action for U.S. Appl. No. 10/139,831, mailed Jun. 27, 2006, 9 pages.
Final Office Action for U.S. Appl. No. 10/139,831, mailed Nov. 28, 2006, 17 pages.
Notice of Allowance for U.S. Appl. No. 10/139,831, mailed Jun. 14, 2007, 26 pages.
Notice of Allowance for U.S. Appl. No. 10/139,831, mailed Jun. 26, 2007, 25 pages.
Non-Final Office Action for U.S. Appl. No. 11/828,246, mailed Jun. 15, 2009, 26 pages.
Non-Final Office Action for U.S. Appl. No. 10/140,088, mailed Apr. 27, 2006, 13 pages.
Notice of Allowance for U.S. Appl. No. 10/140,088, mailed Sep. 7, 2006, 13 pages.
Notice of Allowance for U.S. Appl. No. 10/140,088, mailed Oct. 24, 2006, 8 pages.
Notice of Allowance for U.S. Appl. No. 10/140,088, mailed Jan. 11, 2007, 5 pages.
Non-Final Office Action for U.S. Appl. No. 11/621,038, mailed Apr. 23, 2009, 44 pages.
Non-Final Office Action for U.S. Appl. No. 10/140,749, mailed Aug. 10, 2006, 22 pages.
Final Office Action for U.S. Appl. No. 10/140,749, mailed Jun. 27, 2007, 23 pages.
Final Office Action for U.S. Appl. No. 10/140,749, mailed Jan. 8, 2008, 23 pages.
Non-Final Office Action for U.S. Appl. No. 10/140,749, mailed Jun. 6, 2008, 28 pages.
Final Office Action for U.S. Appl. No. 10/140,749, mailed Dec. 8, 2008, 30 pages.
Non-Final Office Action for U.S. Appl. No. 10/140,749, mailed May 27, 2009, 38 pages.
Non-Final Office Action for U.S. Appl. No. 10/140,753, mailed Apr. 20, 2006, 11 pages.
Final Office Action for U.S. Appl. No. 10/140,753, mailed Jan. 10, 2007, 27 pages.
Non-Final Office Action for U.S. Appl. No. 10/140,753, mailed Aug. 22, 2007, 14 pages.
Non-Final Office Action for U.S. Appl. No. 10/140,753, mailed Jan. 8, 2008, 14 pages.
Final Office Action for U.S. Appl. No. 10/140,753, mailed Aug. 25, 2008, 22 pages.
Requirement for Restriction/Election for U.S. Appl. No. 11/000,359, mailed Jun. 20, 2008, 7 pages.
Non-Final Office Action for U.S. Appl. No. 11/000,359, mailed Oct. 23, 2008, 28 pages.
Non-Final Office Action for U.S. Appl. No. 11/000,359, mailed May 29, 2009, 14 pages.
Requirement for Restriction/Election for U.S. Appl. No. 11/118,697, mailed Jun. 2, 2009, 8 pages.
Non-Final Office Action for U.S. Appl. No. 09/855,038, mailed Jun. 2, 2005, 14 pages.
Final Office Action for U.S. Appl. No. 09/855,038, mailed Feb. 7, 2006, 8 pages.
Non-Final Office Action for U.S. Appl. No. 09/855,038, mailed Oct. 4, 2006, 14 pages.
Notice of Allowance for U.S. Appl. No. 09/855,038, mailed Apr. 26, 2007, 8 pages.
Requirement for Restriction/Election for U.S. Appl. No. 09/988,066, mailed Dec. 13, 2005, 7 pages.
Non-Final Office Action for U.S. Appl. No. 09/988,066, mailed Jul. 14, 2006, 17 pages.
Non-Final Office Action for U.S. Appl. No. 09/988,066, mailed Apr. 6, 2007, 22 pages.

Final Office Action for U.S. Appl. No. 09/988,066, mailed Oct. 31, 2007, 16 pages.
Advisory Action for U.S. Appl. No. 09/988,066, mailed May 28, 2008, 4 pages.
Notice of Allowance for U.S. Appl. No. 09/988,066, mailed Oct. 30, 2008, 16 pages.
Notice of Allowance for U.S. Appl. No. 09/988,066, mailed Jan. 9, 2009, 13 pages.
Non-Final Office Action U.S. Appl. No. 11/804,977, mailed Jan. 14, 2008, 13 pages.
Notice of Allowance for U.S. Appl. No. 11/804,977, mailed Nov. 19, 2008, 17 pages.
Non-Final Office Action for U.S. Appl. No. 09/855,015, mailed Oct. 28, 2004, 12 pages.
Non-Final Office Action for U.S. Appl. No. 09/855,015, mailed Jan. 12, 2006, 6 pages.
Notice of Allowance for U.S. Appl. No. 09/855,015, mailed Sep. 8, 2006, 3 pages.
Requirement for Restriction/Election for U.S. Appl. No. 09/855,015, mailed Nov. 3, 2006, 6 pages.
Notice of Allowance for U.S. Appl. No. 09/855,015, mailed Jan. 7, 2008, 4 pages.
Supplemental Notice of Allowance for U.S. Appl. No. 09/855,015, mailed Feb. 4, 2008, 3 pages.
Non-Final Office Action for U.S. Appl. No. 11/611,067, mailed Feb. 20, 2009, 11 pages.
Non-Final Office Action for U.S. Appl. No. 11/615,769, mailed Apr. 15, 2009, 11 pages.
U.S. Appl. No. 12/639,762, filed Dec. 16, 2009, Singh.
U.S. Appl. No. 12/639,749, filed Dec. 16, 2009, Singh.
U.S. Appl. No. 12/624,300, filed Nov. 23, 2009, Davis et al.
U.S. Appl. No. 12/608,985, filed Oct. 29, 2009, Wong.
U.S. Appl. No. 12/608,972, filed Oct. 29, 2009, Wong.
Final Office Action for U.S. Appl. No. 11/831,950, mailed on Jan. 6, 2010, 21 pages.
Non-Final Office Action for U.S. Appl. No. 11/953,742, mailed on Nov. 19, 2009, 51 pages.
Non-Final Office Action for U.S. Appl. No. 11/953,743, mailed on Nov. 23, 2009, 47 pages.
Non-Final Office Action for U.S. Appl. No. 11/953,745, mailed on Nov. 24, 2009, 48 pages.
Non-Final Office Action for U.S. Appl. No. 11/953,751, mailed on Nov. 16, 2009, 55 pages.
Requirement for Restriction/Election for U.S. Appl. No. 11/668,322, mailed on Oct. 29, 2009, 6 pages.
Notice of Allowance for U.S. Appl. No. 10/139,912, mailed on Oct. 19, 2009, 17 pages.
Notice of Allowance for U.S. Appl. No. 10/139,912, mailed on Nov. 23, 2009, 4 pages.
Final Office Action for U.S. Appl. No. 11/745,008, mailed on Dec. 30, 2009, 27 pages.
Notice of Allowance for U.S. Appl. No. 11/828,246, mailed on Nov. 16, 2009, 20 pages.
Final Office Action for U.S. Appl. No. 11/621,038, mailed on Dec. 23, 2009, 27 pages.
Final Office Action for U.S. Appl. No. 11/611,067, mailed on Oct. 16, 2009, 35 pages.
Non-Final Office Action for U.S. Appl. No. 11/611,067, mailed on Dec. 8, 2009, 11 pages.
Final Office Action for U.S. Appl. No. 10/832,086, mailed on Sep. 29, 2009, 26 pages.
Non-Final Office Action for U.S. Appl. No. 10/140,751, mailed on Sep. 28, 2009, 34 pages.
Notice of Allowance for U.S. Appl. No. 11/000,359, mailed on Sep. 22, 2009, 17 pages.
Notice of Allowance for U.S. Appl. No. 11/118,697, mailed on Sep. 30, 2009, 41 pages.
U.S. Appl. No. 12/505,390, filed Jul. 17, 2009, Patel et al.
Advisory Action for U.S. Appl. No. 11/831,950, mailed on Mar. 4, 2010, 4 pages.
Non-Final Office Action for U.S. Appl. No. 11/779,714, mailed on Mar. 31, 2010, 26 pages.
Non-Final Office Action for U.S. Appl. No. 10/810,208, mailed on Feb. 5, 2010, 13 pages.
Final Office Action for U.S. Appl. No. 11/668,322, mailed on Feb. 24, 2010, 33 pages.
Non-Final Office Action for U.S. Appl. No. 11/854,486, mailed on Jan. 12, 2010, 23 pages.
Final Office Action for U.S. Appl. No. 10/140,751, mailed on Mar. 25, 2010, 29 pages.
Advisory Action for U.S. Appl. No. 11/745,008, mailed on Apr. 21, 2010, 8 pages.
Final Office Action for U.S. Appl. No. 10/140,749, mailed on Jan. 13, 2010, 44 pages.
Non-Final Office Action for U.S. Appl. No. 12/372,390, mailed on Apr. 22, 2010, 46 pages.
Final Office Action for U.S. Appl. No. 11/615,769, mailed on Jan. 22, 2010, 34 pages.
Non-Final Office Action for U.S. Appl. No. 11/646,845, mailed on Oct. 4, 2010, 48 pages.
Final Office Action for U.S. Appl. No. 11/953,742, mailed on Jun. 14, 2010, 21 pages.
Final Office Action for U.S. Appl. No. 11/953,743, mailed on Jul. 15, 2010, 21 pages.
U.S. Appl. No. 12/795,492, filed Jun. 7, 2010, Davis et al.
U.S. Appl. No. 12/702,031, filed Feb. 8, 2010, Davis.
U.S. Appl. No. 12/466,277, filed May 14, 2009, Lin.
U.S. Appl. No. 12/198,710, filed Aug. 26, 2008, Zhang et al.
Non-Final Office Action for U.S. Appl. No. 11/953,745, mailed on Jun. 14, 2010, 19 pages.
Final Office Action for U.S. Appl. No. 11/953,751, mailed on Jun. 25, 2010, 24 pages.
Notice of Allowance for U.S. Appl. No. 10/810,208, mailed on Jul. 15, 2010, 15 pages.
Non-Final Office Action for U.S. Appl. No. 11/668,322, mailed on Jun. 22, 2010, 16 pages.
Notice of Allowance for U.S. Appl. No. 11/854,486, mailed on Jul. 13, 2010, 12 pages.
Notice of Allowance for U.S. Appl. No. 11/621,038, mailed on Apr. 28, 2010, 15 pages.
Non-Final Office Action for U.S. Appl. No. 12/198,710, mailed on Sep. 28, 2010, 15 pages.
Non-Final Office Action for U.S. Appl. No. 12/639,762, mailed on Sep. 1, 2010, 40 pages.
Non-Final Office Action for U.S. Appl. No. 12/400,594, mailed on May 14, 2010, 53 pages.
Non-Final Office for U.S. Appl. No. 12/400,645, mailed on Sep. 1, 2010, 45 pages.
Non-Final Office Action for U.S. Appl. No. 12/372,390, mailed on Sep. 13, 2010, 10 pages.
Non-Final Office Action for U.S. Appl. No. 12/070,893, mailed on Jun. 10, 2010, 44 pages.
Advisory Action for U.S. Appl. No. 11/615,769, mailed on May 25, 2010, 3 pages.
Notice of Allowance for U.S. Appl. No. 11/615,769, mailed on Jul. 12, 2010, 14 pages.
Non-Final Office Action for U.S. Appl. No. 10/140,751, mailed Dec. 20, 2010, 23 pages.
Notice of Allowance for U.S. Appl. No. 12/400,645, mailed on Jan. 26, 2011, 14 pages.
U.S. Appl. No. 12/880,518, filed Sep. 13, 2010, Wong.
Non-Final Office Action for U.S. Appl. No. 11/953,742, mailed on Mar. 30, 2011, 23 pages.
Non-Final Office Action for U.S. Appl. No. 11/953,751, mailed on Mar. 29, 2011, 29 pages.
Non-Final Office Action for U.S. Appl. No. 11/779,778, mailed on Feb. 2, 2011, 63 pages.
Final Office Action for U.S. Appl. No. 11/668,322, mailed on Feb. 1, 2011, 17 pages.
Non-Final Office Action for U.S. Appl. No. 12/795,492, mailed on Mar. 17, 2011, 51 pages.
Non-Final Office Action for U.S. Appl. No. 12/198,710, mailed on Mar. 24, 2011, 40 pages.
Notice of Allowance for U.S. Appl. No. 12/639,749, mailed on Feb. 11, 2011, 51 pages.

Notice of Allowance for U.S. Appl. No. 12/639,762, mailed on Mar. 4, 2011, 7 pages.
Notice of Allowance for U.S. Appl. No. 12/400,594, mailed on Mar. 23, 2011, 11 pages.
Notice of Allowance for U.S. Appl. No. 12/372,390, mailed on Mar. 9, 2011, 8 pages.
Non-Final Office Action for U.S. Appl. No. 12/070,893, mailed on Mar. 18, 2011, 7 pages.
U.S. Appl. No. 12/883,073, filed Sep. 15, 2010, Davis.
U.S. Appl. No. 12/900,279, filed Oct. 7, 2010, Bansal et al.
Final Office Action for U.S. Appl. No. 11/779,714, mailed on Nov. 9, 2010, 24 pages.
Requirement for Restriction/Election for U.S. Appl. No. 12/639,749, mailed on Dec. 7, 2010, 3 pages.
Final Office Action for U.S. Appl. No. 12/400,594, mailed on Oct. 28, 2010, 13 pages.
Non-Final Office Action for U.S. Appl. No. 12/505,390, mailed on Oct. 28, 2010, 51 pages.
Final Office Action for U.S. Appl. No. 12/070,893, mailed on Nov. 24, 2010, 11 pages.
Final Office Action for U.S. Appl. No. 11/646,845, mailed on Jun. 9, 2011, 22 pages.
Notice of Allowance for U.S. Appl. No. 11/953,743, mailed on Apr. 28, 2011, 19 pages.
Final Office Action for U.S. Appl. No. 10/140,751, mailed on Jun. 28, 2011, 23 pages.
Non-Final Office Action for U.S. Appl. No. 12/702,031, mailed on Apr. 29, 2011, 5 pages.
Notice of Allowance for U.S. Appl. No. 11/779,778, mailed on Jul. 28, 2011, 9 pages.
Final Office Action for U.S. Appl. No. 12/795,492, mailed on Jul. 20, 2011, 11 pages.
Requirement for Restriction/Election for U.S. Appl. No. 12/466,277, mailed on Aug. 9, 2011, 6 pages.
Non-Final Office Action for U.S. Appl. No. 11/646,845, mailed on Oct. 14, 2011, 19 pages.
Non-Final Office Action for U.S. Appl. No. 11/831,950, mailed Aug. 26, 2011, 45 pages.
Final Office Action for U.S. Appl. No. 11/953,742, mailed on Oct. 26, 2011, 19 pages.
Non-Final Office Action for U.S. Appl. No. 11/668,322, mailed on Aug. 30, 2011 17 pages.
Non-Final Office Action for U.S. Appl. No. 11/745,008, mailed on Sep. 14, 2011, 26 pages.
Notice of Allowance for U.S. Appl. No. 12/795,492, mailed on Nov. 14, 2011, 10 pages.
Final Office Action for U.S. Appl. No. 12/198,710, mailed on Oct. 19, 2011, 58 pages.
Final Office Action for U.S. Appl. No. 12/070,893, mailed on Sep. 21, 2011, 12 pages.
Notice of Allowance for U.S. Appl. No. 12/466,277, mailed on Nov. 2, 2011, 47 pages.

* cited by examiner

SELECTION OF TRUNK PORTS AND PATHS USING ROTATION

CROSS-REFERENCES TO RELATED APPLICATIONS

The present application claims the benefit and priority under 35 U.S.C. 119(e) from the following U.S. Provisional Applications, the entire contents of which are herein incorporated by reference for all purposes:

(1) U.S. Provisional Application No. 61/015,151 filed Dec. 19, 2007 entitled ADVANCED LOAD BALANCING FOR TRAFFIC OVER TRUNK INTERFACES AND/OR EQUAL COST ROUTED PATHS;

(2) U.S. Provisional Application No. 61/015,153 filed Dec. 19, 2007 entitled EQUAL COST MULTIPLE PATH AND TRUNK DIVERSIFICATION FOR SINGLE AND MULTI-STAGE NETWORK; and (3) U.S. Provisional Application No. 60/975,363 filed Sep. 26, 2007 entitled FAST AND EFFICIENT TRUNK MANAGEMENT.

The present application also incorporates by reference for all purposes the entire contents of U.S. Non-Provisional application Ser. No. 12/198,710, entitled TECHNIQUES FOR SELECTING PATHS AND/OR TRUNK PORTS FOR FORWARDING TRAFFIC FLOWS filed concurrently with the present application.

BACKGROUND OF THE INVENTION

Embodiments of the present application relate to forwarding data packets in a computer network, and more particularly to techniques for selecting a path such as an Equal Cost MultiPath (ECMP) path and/or a trunk port for forwarding data packets.

Network devices commonly have to select a path from multiple available choices for forwarding a packet. For example, ECMP is a routing strategy where next-hop packet forwarding to a destination can occur over multiple equal cost routing paths. The effect of multipath routing on a network device (e.g., a router) configured to forward packets is that the network device potentially has several next-hops for any given destination and must use some method to choose which path to the next-hop should be used for a given data packet. The use of ECMP helps to reduce delay and congestion in networks by taking advantage of multiple paths through a network by splitting traffic flows across those paths. Accordingly, in order to support ECMP path selection, a network device such as a router has to be able to select a particular ECMP path from multiple available paths to forward a packet.

Trunking is another technique that is commonly used in networks. A trunk represents a logical collection of multiple output ports generally associated with the same route or connected to the same MAC address. In a network environment, when a selected output path for a packet is a trunk, a network device has to be able to select a port from multiple ports associated with the trunk for forwarding the packet. In certain network environments, a selected ECMP path may itself correspond to a trunk. In such an environment, in addition to selecting a particular ECMP path, the network device also has to select a particular output port from the multiple output ports associated with the trunk for forwarding the data packet.

Conventionally, selection of paths (e.g., ECMP paths) and/or trunk ports for data forwarding is done by simply hashing on various fields of a packet header, such as based upon the IP source and destination address fields, and using the hash for selecting the path and/or trunk port. The diversification in the selection offered by such conventional techniques however is quite poor and does not offer proper distribution of traffic to the available paths and/or trunk ports. For example in ECMP forwarding, poor diversification results in the same ECMP path and/or trunk being selected for forwarding the traffic flow packets at multiple stages of the network. As a result, a router forwards traffic with the same source and destination addresses using the same port of a trunk or the same path, not fully utilizing the bandwidth available for the traffic via other ports or paths available to the router. Accordingly, using conventional techniques in which all routers in the network derive their hashing decision purely based on information extracted from the packet header, correlation occurs among routers that any given packet flow traverses, and such correlation reduces diversification. Further, existing ECMP solutions only work in some network topologies and provide limited diversification.

BRIEF SUMMARY OF THE INVENTION

Embodiments of the present invention provide techniques that offer enhanced diversity in the selection of paths (e.g., ECMP paths) and/or ports from ports associated with trunks for forwarding network data traffic. In one embodiment, a network device uses a rotate function to generate a rotated index (path index) that is used to select a path (e.g., an ECMP) path from multiple paths (e.g., multiple ECMP paths) for forwarding a packet. A network device may also generate a rotated index (trunk index) that is used to select an output port from multiple output ports associated with a trunk for forwarding the packet.

In one embodiment, different network devices may be configured to apply different amounts of rotation to generate the rotated indices. As a result, for the same packet, the rotated path and trunk indices generated at one network device may be different from the rotated path and trunk indices generated at a second network device. As a result, different paths and/or port trunks may be selected for forwarding the same packet (or same traffic flows) at different network devices in a multistage network.

According to an embodiment of the present invention, techniques are provided for selecting a path for forwarding a packet. A first value may be generated at a first network device based upon one or more sections of the packet. The first value may be rotated at the first network device by a first amount to generate a first rotated index, wherein the first amount is preconfigured for the first network device. A path from a plurality of paths may be selected at the first network device for forwarding the packet from the first network device based upon the first rotated index.

In one embodiment, the one or more sections of the packet may be hashed to generate a hash value, and the first value may be generated using the hash value.

In one embodiment, the packet may be communicated from the first network device to a second network device using the selected path. At the second network device, a second value may be generated based upon the one or more sections of the packet. The second value may be rotated at the second network device by a second amount to generate a second rotated index, wherein the second amount is preconfigured for the second network device and is different from the first amount. A path from a plurality of paths may be selected at the second network device for forwarding the packet from the second network device based upon the second rotated index.

According to an embodiment of the present invention, techniques are provided for selecting a port for forwarding a packet. A first value may be generated at a first network device based upon one or more sections of the packet. The first value may be rotated at the first network device by a first amount to generate a first rotated index, wherein the first amount is preconfigured for the first network device. A port from a plurality of ports associated with a trunk may be selected at the first network device for forwarding the packet from the first network device based upon the first rotated index. In one embodiment, the one or more sections of the packet may be hashed to generate a hash value, and the first value may be generated using the hash value.

In one embodiment, the packet may be communicated from the first network device to a second network device using the selected port. At the second network device, a second value may be generated based upon the one or more sections of the packet. The second value may be rotated at the second network device by a second amount to generate a second rotated index, wherein the second amount is preconfigured for the second network device and is different from the first amount. A port from a plurality of ports associated with a trunk may be selected at the second network device for forwarding the packet from the second network device based upon the second rotated index.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Figure 1:
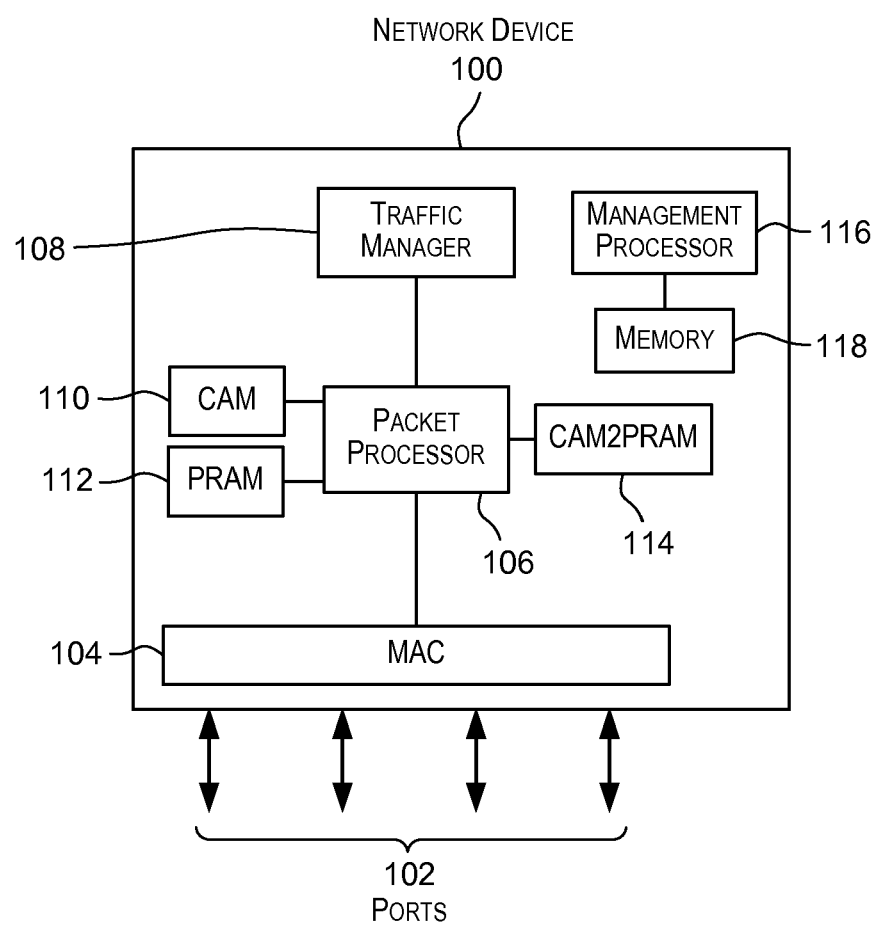
FIG. 1 depicts a simplified block diagram of a network device that may incorporate an embodiment of the present invention.

Embodiments of the present invention provide techniques that enhance diversification in the selection of paths (e.g., ECMP paths) and/or selection of trunk ports for forwarding traffic flows comprising packets. FIG. 1 depicts a simplified block diagram of a network device 100 that may incorporate an embodiment of the present invention. In the embodiment depicted in FIG. 1, network device 100 comprises a plurality of ports 102, a media access controller (MAC) 104, a packet processor 106, one or more memories associated with packet processor 106 such as a content-addressable memory (CAM) 110, a parameter RAM (PRAM) 112, a table 114 (referred to as CAM2PRAM), a traffic manager 108, and a management processor 116 with associated memory 118. The components of network device 100 depicted in FIG. 1 are meant for illustrative purposes only and are not intended to limit the scope of the invention in any manner. Alternative embodiments may have more or less components. For example, while only one packet processor 106 is depicted in FIG. 1, alternative embodiments may have multiple packet processors.

Network device 100 receives and transmits data flows comprising packets using ports 102. A port within ports 102 may be classified as an input port or an output port depending upon whether a packet is received or transmitted using the port. A port over which a packet is received by network device 100 is referred to as an input port. A port used for communicating or transmitting a packet from network device 100 is referred to as an output port. A particular port may function both as an input port and an output port. Ports 102 may be capable of receiving and/or transmitting different types of data traffic at different speeds including 1 Gigabit/sec, 10 Gigabits/sec, or more. In some embodiments, multiple ports of network device 100 may be logically grouped into one or more trunks. A trunk represents a logical collection of multiple output ports of a network device generally associated with the same route or connected to the same MAC address.

In one embodiment, network device 100 may receive one or more packets via one or more input ports. For a packet received over an input port, network device 100 may be configured to determine an output port for the packet. The packet may then be forwarded to the determined output port and transmitted from network device 100 using the output port. As part of the processing to determine an output port for a packet, network device 100 may be configured to select a particular path (e.g., an ECMP path) from multiple paths (e.g., multiple ECMP paths) that may be available for forwarding the packet and select an output port corresponding to the particular selected path. If the selected path is a trunk, as part of forwarding a packet from an input port to an output port, network device 100 may be configured to select a particular output port from the multiple output ports associated with the selected trunk for forwarding the packet. The packet may then be communicated from network device 100 using the selected trunk output port.

In the embodiment depicted in FIG. 1, ports 102 are coupled to a media access controller (MAC) 104. Packets received by network device 100 via one or more ports 102 may be forwarded to MAC device 104 and then to packet processor 106 for further processing. MAC 104 provides an interface between ports 102 and packet processor 106.

Packet processor 106 is configured to process each packet received by network device 100 and determine how the packet is to be forwarded. This processing may involve performing lookups in CAM 110, PRAM 112, and CAM2PRAM 114. In one embodiment, as part of the processing, packet processor 106 is configured to determine an output port to which the packet is to be forwarded. As part of determining an output port to which the packet is to be forwarded, packet processor 106 is configured to select a particular path from multiple paths for forwarding the packet and then select an output port corresponding to a particular selected path. For example, packet processor 106 may be configured to select an ECMP path from multiple ECMP paths for forwarding the packet and forward the packet to a port corresponding to the selected ECMP path. If the selected path is a trunk, as part of determining an output port to which the packet is to be forwarded, packet processor 106 is configured to select a particular output port from the multiple output ports associated with the selected trunk for forwarding the packet. The packet may then be communicated from network device 100 using the selected output port. In some scenarios, the selected path may itself be a trunk. In such a scenario, upon selecting a particular path, packet processor 106 is configured to select a particular output port from the multiple output ports associated with the selected path for forwarding the packet.

According to an embodiment of the present invention, packet processor 106 performs the selection of a path and/or selection of a port from ports grouped as a trunk using techniques that provide enhanced diversification in the selection of the path and/or trunk port. Embodiments of the present invention provide enhanced diversification by more equally distributing traffic flows between available paths (e.g., ECMP paths) and/or trunk ports.

In one embodiment, packet processor 106 is configured to extract one or more sections of the packet to be forwarded. Packet processor 106 is then configured to hash the extracted sections of the packet to generate a hash value. A trunk index is then determined based upon the hash value. In one embodiment, the trunk index is the hash value itself. The trunk index is then rotated or shifted (e.g., using a barrel shifter) by a certain amount to produce a rotated trunk index that is then used for selecting an output port from multiple ports associated with a trunk for forwarding a packet.

In one embodiment, a path index is derived from the hash value. In some embodiments, the path index is derived from the trunk index (e.g., the path index is set to the trunk index or a flipped trunk index). Network device 100 is then configured to rotate or shift (e.g., using a barrel shifter) the path index by a set amount to generate a rotated path index. The rotated path index is then used for selecting a path from multiple possible paths for forwarding the packet. The packet may then be forwarded by network device 100 using an output port corresponding to the selected path. For example, the rotated path index may be used to select an ECMP path from multiple ECMP paths. A rotated path index used for selecting an ECMP path may also be referred to as a rotated ECMP index. If the selected path is itself a trunk, then the trunk index may be used to select a particular port from the possibly multiple ports associated with the trunk for forwarding the packet.

The amount of rotation that is applied by a network device to generate the rotated trunk index and/or the rotated path index may be user-configurable and may be preconfigured for the network device. Different network devices in a network environment may be configured to apply different amounts of rotations. As a result, the amount of rotation applied by one network device may be different from the amount of rotation applied by another network device. Consequently, for the same packet, the rotated index generated by one network device may be different from the rotated index generated by another network device. In one embodiment, the amount of rotation that a particular network device is configured to perform may be predefined and controlled by a control variable(s) configured for that network device. In a network device, the amount of rotation used for generating a rotated trunk index may be the same as or different from the amount of rotation used for generating a rotated path index. Since different network devices may perform different amounts of rotation, a rotated trunk index generated by one network device for a packet may be different from a rotated trunk index generated for the same packet by another network device. Likewise, a rotated path index generated by one network device for a packet may be different from a rotated path index generated by another network device for the same packet. This enables diversification in the selection of paths and/or trunk ports for forwarding network traffic in a network environment.

As depicted in FIG. 1, network device 100 may comprise a management processor 116 that is configured to perform housekeeping and management functions related to network device 100. For example, programming and maintenance of tables and information in CAM 110, PRAM 112, and CAM2PRAM 114 may be performed using management processor 116. In one embodiment, management processor 116 may be a general purpose microprocessor such as a PowerPC, Intel, AMD, or ARM microprocessor, operating under the control of software stored in a memory 118 accessibly coupled to the management processor 116.

Since processing performed by packet processor 106 needs to be performed at a high packet rate in a deterministic manner, packet processor 106 is generally a dedicated hardware device configured to perform the processing. In one embodiment, packet processor 106 may be a programmable logic device such as a field programmable gate array (FPGA). Packet processor 106 may also be an ASIC.

In one embodiment, network device 100 may comprise multiple linecards, with each linecard comprising the components depicted in FIG. 1. In such an embodiment, an output port to which a packet is forwarded for transmission from the network device may lie on the same linecard as the input port or on a different linecard. Traffic manager 108 is configured to facilitate communications between the different linecards.

Figure 2:
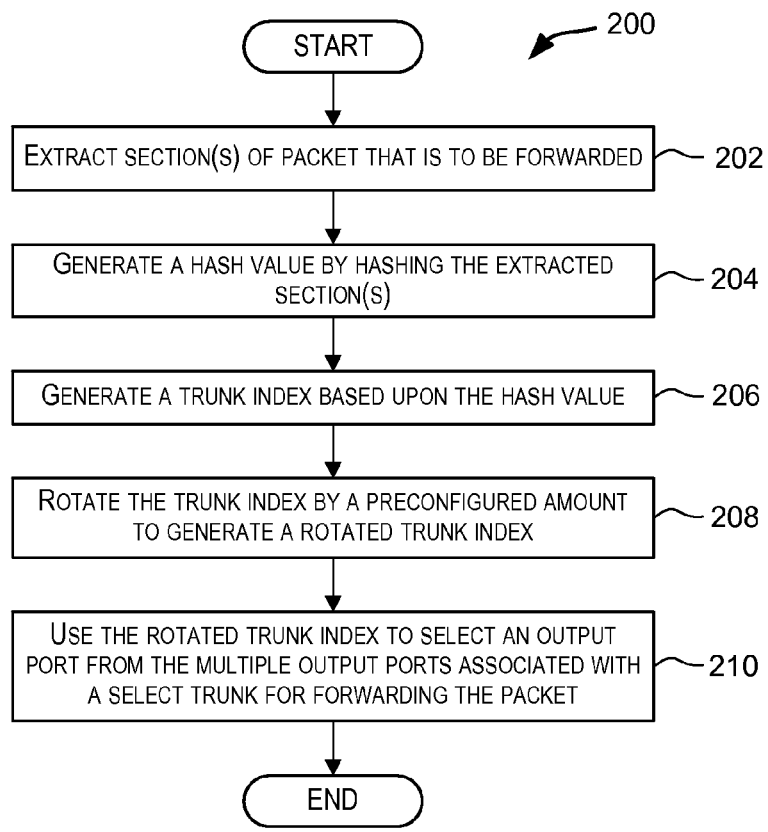
FIG. 2 depicts a simplified flowchart depicting a method for generating a rotated trunk index for selecting a trunk port from multiple ports associated with a trunk for forwarding a packet according to an embodiment of the present invention.

FIG. 2 depicts a simplified flowchart 200 depicting a method for generating a rotated trunk index for selecting a trunk port from multiple ports associated with a trunk for forwarding a packet according to an embodiment of the present invention. In one embodiment, the processing depicted in FIG. 2 is performed by packet processor 106 depicted in FIG. 1. In other embodiments, the processing may be performed by one or more components of network device 100, including or not including packet processor 106. The processing may be performed by software executed by a processor, hardware, or combinations thereof.

As depicted in FIG. 2, one or more sections of the packet to be forwarded are extracted (step 202). The extracted sections may include, for example, sections from the header of the packet, sections from the payload section of the packet, and/or combinations of sections selected from different parts of the packet. In one embodiment, the extracted section includes information extracted from the packet such as link layer (L2) network header, network layer (L3) network header, and transport layer (L4) network header of the packet. The sections of a packet that are extracted in 202 may also depend on the type of packet that is to be forwarded. For example, the sections of a packet extracted for a packet of a first type (e.g., IPv4 packet) may be different from the sections extracted for a packet of a different type (e.g., IPv6 packet). The sections of a packet that are to be extracted may be user-programmable. In one embodiment, 256-bits from the header of the packet are extracted. For a network device, packet processor 106 may be preconfigured to extract specific sections of the packet in 202.

A hash value is then generated by hashing the section(s) extracted in 202 (step 204). Different techniques may be used for the hashing. In one embodiment, a random number may also be used along with the extracted portions to generate a hash value in 204.

A trunk index is then determined from the hash value generated in 204 (step 206). Different techniques may be used to determine the trunk index from the hash value. In one embodiment, the trunk index is set to the hash value. In an alternative embodiment, the hash value is flipped to generate the trunk index.

The trunk index generated in 206 is then rotated by a preconfigured amount to generate a rotated trunk index (step 208). The amount of rotation applied by a network device may be preconfigured for the network device. In one embodiment, the amount of rotation may be based upon a control value (trunk index control value) preconfigured for the network device. The rotated trunk index generated in 208 may then be used to select an output port from ports associated with a trunk selected for forwarding the packet (step 210). The packet may then be forwarded to the selected output port and then transmitted from the network device using the output port.

Figure 3:
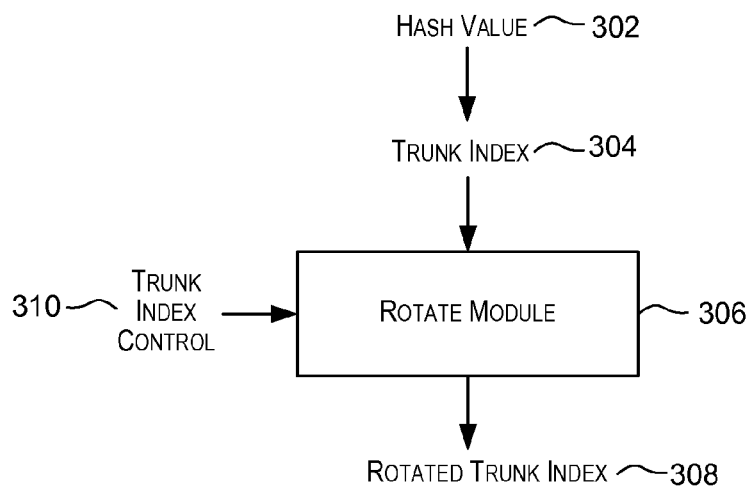
FIG. 3 depicts a simplified block diagram of a module that may be used to generate a rotated trunk index according to an embodiment of the present invention.

FIG. 3 depicts a simplified block diagram of a module that may be used to generate a rotated trunk index according to an embodiment of the present invention. The module depicted in FIG. 3 may be implemented in software (e.g., program code or instructions executed by a processor), or in hardware, or combinations thereof. The software may be stored on a computer-readable medium such as memory, a disk, etc. In one embodiment, the functionality of the module depicted in FIG. 3 may be implemented by packet processor 106. For example, the module may be implemented as a hardware component of packet processor 106. The functionality of the module may be implemented in a programmable logic device such as a field programmable gate array (FPGA) or in an ASIC.

As depicted in FIG. 3, a trunk index 304 is determined from a hash value 302. Trunk index 304 is then input to a rotate module 306 that is configured to rotate the trunk index by a preconfigured amount and generate a rotated trunk index 308. The amount of rotation applied by module 306 may be based upon a control value "trunk index control" 310. The trunk index control value may be preconfigured for a network device and may be different for different network devices. Rotated trunk index 308 that is generated from the rotation may then be used to select a port from multiple ports associated with a trunk for forwarding the packet.

The following pseudo code depicts a technique that may be used for generating a rotated trunk index according to an embodiment of the present invention:

TRUNK_INDEX [7:0]=Hash Value;
case (TRUNK_INDEX_CONTROL_VALUE[2:0]){
  0: ROTATED_TRUNK_INDEX[7:0]=TRUNK_INDEX [7:0];
  1: ROTATED_TRUNK_INDEX[7:0]={TRUNK_INDEX [0], TRUNK_INDEX[7:1]};
  2: ROTATED_TRUNK_INDEX[7:0]={TRUNK_INDEX [1:0], TRUNK_INDEX[7:2]};
  3: ROTATED_TRUNK_INDEX[7:0]={TRUNK_INDEX [2:0], TRUNK_INDEX[7:3]};
  4: ROTATED_TRUNK_INDEX[7:0]={TRUNK_INDEX [3:0], TRUNK_INDEX[7:4]};
  5: ROTATED_TRUNK_INDEX[7:0]={TRUNK_INDEX [4:0], TRUNK_INDEX[7:5]};
  6: ROTATED_TRUNK_INDEX[7:0]={TRUNK_INDEX [5:0], TRUNK_INDEX[7:6]};
  7: ROTATED_TRUNK_INDEX[7:0]={TRUNK_INDEX [6:0], TRUNK_INDEX[7]};
}

According to the pseudo code depicted above, the TRUNK INDEX is set to the Hash Value. The amount by which TRUNK_INDEX is rotated is controlled by TRUNK_INDEX_CONTROL_VALUE which may be preconfigured for a network device. If the control value is 0 then no rotation is performed, if the control value is 1 then the TRUNK_INDEX is rotated by 1-bit, if the control value is 2 then the TRUNK_INDEX is rotated by 2-bits, if the control value is 3 then the TRUNK_INDEX is rotated by 3-bits, if the control value is 4 then the TRUNK_INDEX is rotated by 4-bits, if the control value is 5 then the TRUNK_INDEX is rotated by 5-bits, if the control value is 6 then the TRUNK_INDEX is rotated by 6-bits, and if the control value is 7 then the TRUNK_INDEX is rotated by 7-bits. The resultant ROTATED_TRUNK_INDEX may then be used to select an output port from multiple ports associated with a trunk selected for forwarding the packet.

Figure 4:
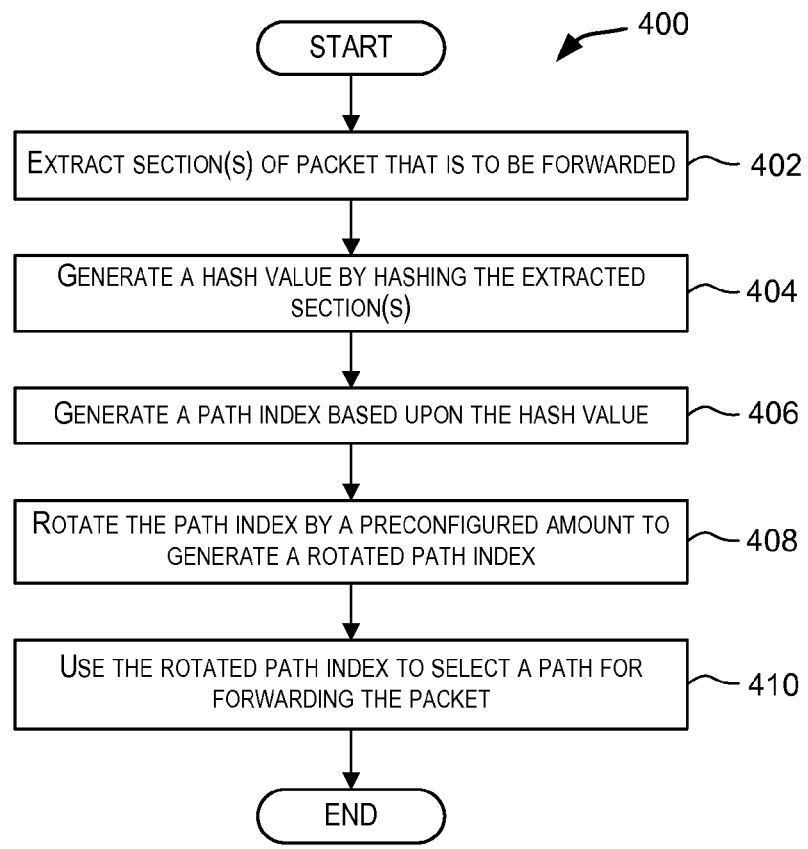
FIG. 4 depicts a simplified flowchart depicting a method for generating a rotated path index for selecting a path from multiple paths for forwarding a packet according to an embodiment of the present invention.

FIG. 4 depicts a simplified flowchart 400 depicting a method for generating a rotated path index for selecting a path (e.g., an ECMP path) from multiple paths (e.g., from multiple ECMP paths) for forwarding a packet according to an embodiment of the present invention. In one embodiment, the processing depicted in FIG. 4 is performed by packet processor 106 depicted in FIG. 1. In other embodiments, the processing may be performed by one or more components of network device 100, including or not including packet processor 106. The processing may be performed by software executed by a processor, hardware, or combinations thereof.

As depicted in FIG. 4, one or more sections of the packet to be forwarded are extracted (step 402). The extracted sections may include, for example, sections from the header of the packet, sections from the payload section of the packet, and/or combinations of sections selected from different parts of the packet. In one embodiment, the extracted section includes information extracted from the packet such as link layer (L2) network header, network layer (L3) network header, and transport layer (L4) network header of the packet. The sections of a packet that are extracted in 402 may also depend on the type of packet that is to be forwarded. For example, the sections of a packet extracted for a packet of a first type (e.g., IPv4 packet) may be different from the sections extracted for a packet of a different type (e.g., IPv6 packet). In one embodiment, 256-bits from the header of the packet are extracted. For a network device, packet processor 106 may be preconfigured to extract specific sections of the packet in 202. The sections of a packet that are to be extracted may be user-programmable. The section(s) of the packet extracted in 202 may be the same as or different from the section(s) extracted in 402.

A hash value is then generated by hashing the section(s) extracted in 402 (step 404). Various different hashing techniques may be used. In one embodiment, a random number may also be used along with the extracted sections to generate a hash value in 404.

A path index is then determined from the hash value generated in 404 (step 406). Different techniques may be used to determine the path index from the hash value. In one embodiment, the path index is set to the hash value. In an alternative embodiment, the hash value is flipped to generate the path index. The generation of the path index from the hash value may also depend upon how the trunk index was generated using the hash value. In one embodiment, the trunk index is set to the hash value while the path index is set to the flipped version of the hash value.

The path index generated in 406 is then rotated by a preconfigured amount to generate a rotated path index (step 408). The amount of rotation applied by a network device may be preconfigured for the network device. In one embodiment, the amount of rotation may be based upon a control value (path index control value) preconfigured for the network device. The rotated path index generated in 408 may then be used to select a path (e.g., an ECMP path) from multiple available paths (e.g., multiple ECMP paths) for forwarding the packet (step 410). An output port corresponding to the selected path may also be determined in 410. The packet may then be forwarded to the selected output port corresponding to the selected path and then transmitted from the network device using the output port.

Figure 5:
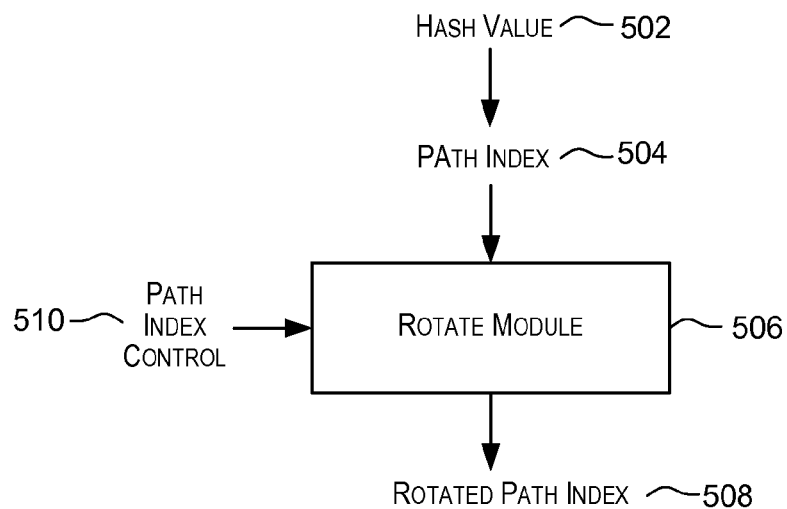
FIG. 5 depicts a simplified block diagram of a module that may be used to generate a rotated path index according to an embodiment of the present invention.

FIG. 5 depicts a simplified block diagram of a module that may be used to generate a rotated path index according to an embodiment of the present invention. The module depicted in FIG. 5 may be implemented in software (e.g., program code or instructions executed by a processor), or in hardware, or combinations thereof. The software may be stored on a computer-readable medium such as memory, a disk, etc. In one embodiment, the functionality of the module depicted in FIG. 5 may be implemented by packet processor 106. For example, the module may be implemented as a hardware component of packet processor 106. The functionality of the module may be implemented in a programmable logic device such as a field programmable gate array (FPGA) or in an ASIC.

As depicted in FIG. 5, a path index 504 is determined from a hash value 502. Path index 504 is then input to a rotate module 506 that is configured to rotate the path index by a preconfigured amount and generate a rotated path index 508. The amount of rotation applied by module 506 may be based upon a control value "path index control" 510. The path index control value may be preconfigured for a network device and may be different in different network devices. Rotated path index 508 may then be used by the network device to select a path from multiple paths for forwarding the packet.

In one embodiment, the same rotate module may be used for to generate a rotated trunk index and a rotated path index. The amount of rotation applied by a network device to generate a rotated path index may be the same as or different from the amount of rotation applied by the network device to generate a rotated trunk index. The same or different control values (e.g., the path index control value and the trunk index control value) may be used to control the rotation for generating a rotated trunk index and/or a rotated path index.

The following pseudo code depicts a technique that may be used for generating a rotated path index (assumed to be an ECMP index for selecting an ECMP path) according to an embodiment of the present invention:

ECMP_INDEX [7:0]=Hash Value;
case (ECMP_INDEX_CONTROL_VALUE[2:0]){
  0: ROTATED_ECMP_INDEX[7:0]=ECMP_INDEX[7:0];
  1: ROTATED_ECMP_INDEX[7:0]={ECMP_INDEX[0], ECMP_INDEX[7:1]};
  2: ROTATED_ECMP_INDEX[7:0]={ECMP_INDEX[1:0], ECMP_INDEX[7:2]};
  3: ROTATED_ECMP_INDEX[7:0]={ECMP_INDEX[2:0], ECMP_INDEX[7:3]};
  4: ROTATED_ECMP_INDEX[7:0]={ECMP_INDEX[3:0], ECMP_INDEX[7:4]};
  5: ROTATED_ECMP_INDEX[7:0]={ECMP_INDEX[4:0], ECMP_INDEX[7:5]};
  6: ROTATED_ECMP_INDEX[7:0]={ECMP_INDEX[5:0], ECMP_INDEX[7:6]};
  7: ROTATED_ECMP_INDEX[7:0]={ECMP_INDEX[6:0], ECMP_INDEX[7]};
}

According to the pseudo code depicted above, ECMP_INDEX is set to the hash value. The amount by which ECMP_INDEX is rotated is controlled by ECMP_INDEX_CONTROL_VALUE which may be preconfigured for a network device. If the control value is 0 then no rotation is performed, if the control value is 1 then the ECMP_INDEX is rotated by 1-bit, if the control value is 2 then the ECMP_INDEX is rotated by 2-bits, if the control value is 3 then the ECMP_INDEX is rotated by 3-bits, if the control value is 4 then the ECMP_INDEX is rotated by 4-bits, if the control value is 5 then the ECMP_INDEX is rotated by 5-bits, if the control value is 6 then the ECMP_INDEX is rotated by 6-bits, and if the control value is 7 then the ECMP_INDEX is rotated by 7-bits. The resultant ROTATED_ECMP_INDEX may then be used to select a path from multiple paths available for forwarding the packet.

It should be apparent that both the path index and the trunk index do not have to be used each time. A rotated trunk index may need to be used only when the selected path for forwarding a packet is a trunk. Similarly, a path index may need to be used only when there are multiple paths available for forwarding the packet and a single path has to be selected. There may be no need to use a path index in network topologies where there is only one or no path from a network device for forwarding a packet. Embodiments of the present invention thus provide the flexibility of using a path index and/or a trunk index as and when appropriate.

Figure 6:
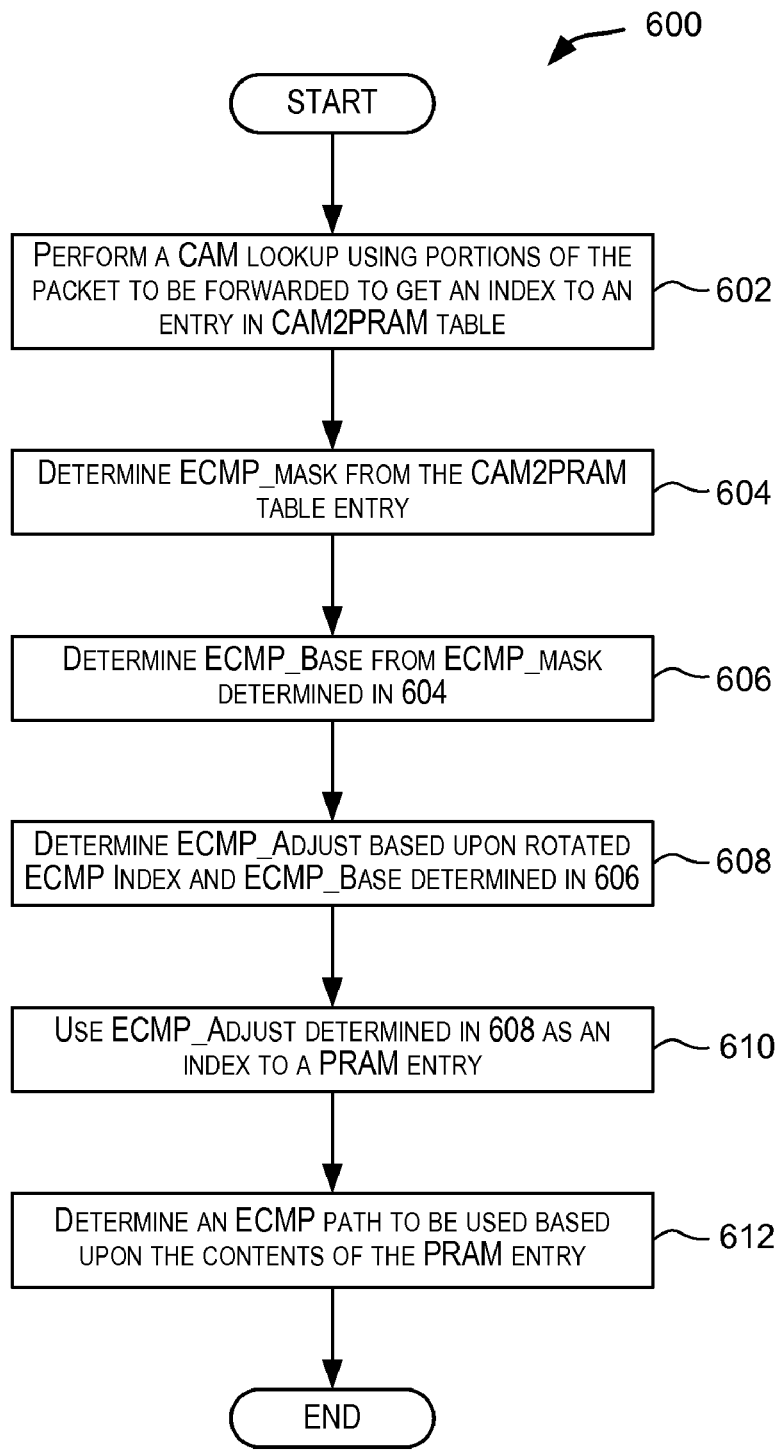
FIG. 6 depicts a simplified flowchart depicting a method of using a rotated path index to select a path according to an embodiment of the present invention.

Once the rotated path index and the rotated trunk index have been determined, the rotated indices are then be used to select a path and/or a trunk port for forwarding a packet. Various different techniques may be used to select the path and/or trunk port using a rotated path index and a rotated trunk index. FIG. 6 depicts a simplified flowchart 600 depicting a method of using a rotated path index to select a path according to an embodiment of the present invention. The method depicted in FIG. 6 assumes that the path index is used for selecting an ECMP path and the index is thus referred to as an ECMP index. The method depicted in FIG. 6 and described below is illustrative of one embodiment of using the path index and is not meant to limit the scope of embodiments of the present invention as recited in the claims. Other methods may be used in alternative embodiments. The processing depicted in FIG. 6 may be performed by packet processor 106 depicted in FIG. 1.

As depicted in FIG. 6, a CAM lookup (e.g., using CAM 110 depicted in FIG. 1) is performed using sections extracted from the packet to be forwarded to get an index to an entry in CAM2PRAM table (e.g., CAM2PRAM 114 depicted in FIG. 1) (step 602). The sections of the packet used in 602 may or may not be the same as the sections used for generating the hash value depicted in FIGS. 2 and 4. In one embodiment, a section of the header of the packet is extracted and used to perform a CAM lookup. A matching entry in the CAM yields an index pointing to an entry in the CAM2PRAM table.

An ECMP_mask value is then determined from the CAM2PRAM table entry determined from the CAM lookup performed in 602 (step 604). In one embodiment, the ECMP_mask is a 4-bit value from zero to the number of ECMP paths minus one. In order to get the number of ECMP paths and to avoid having to deal with a modulo operation (described below) using a zero base, an ECMP_Base value is determined from the ECMP_mask by adding one to the ECMP_mask (step 606). In one embodiment, the ECMP_Base value is determined as follows (by adding 1 to the 4-bit number):

ECMP_Base[4:0]=ECMP_mask[3:0]+4'h1//0-15→1-16 ports

The ECMP_Base identifies the total number of ECMP paths that are available for forwarding the packet from the network device.

An ECMP_Adjust value is then determined based upon the ECMP_Base determined in 606 and the rotated ECMP index generated as previously described (for example, the rotated path index generated in step 408 of FIG. 4) (step 608). In one embodiment, the ECMP_Adjust is determined using a modulo operation as follows:

ECMP_Adjust[4:0]=Rotated ECMP Index[15:0] % ECMP_Base[4:0]

The ECMP_Adjust determined in 608 thus represents a number between 1 and the total number of available ECMP paths and used for path selection. The ECMP_Adjust is used an index to an entry in the PRAM (e.g., in PRAM 112 depicted in FIG. 1) (step 610).

The ECMP path to be used is then determined based upon the contents of the PRAM entry (step 612). In one embodiment, a forwarding identifier (FID) is determined from the PRAM entry. The particular ECMP path to be used for forwarding the packet is then determined from the FID. In one embodiment, an output port corresponding to the selected ECMP path is also determined in 612.

Figure 7:
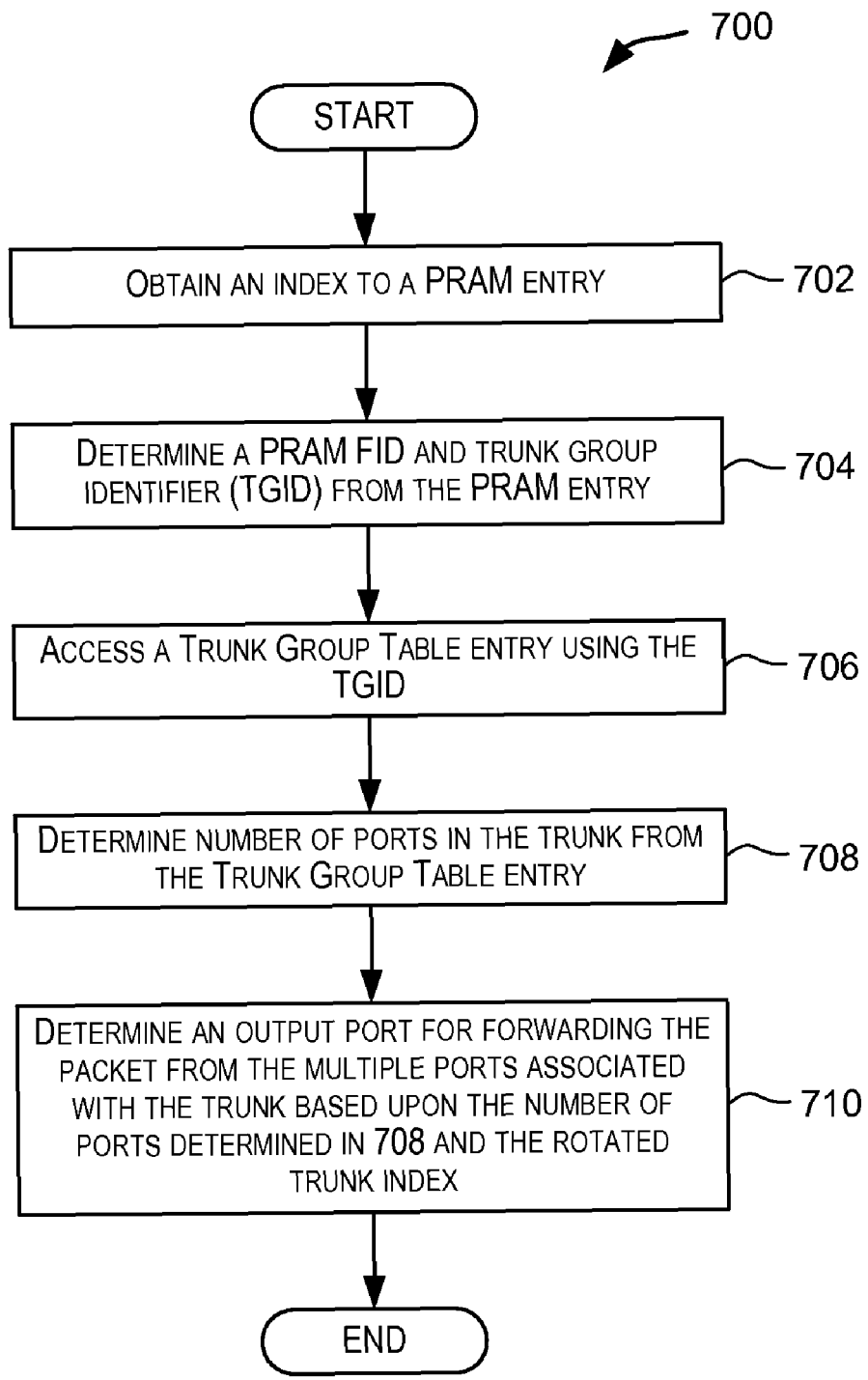
FIG. 7 depicts a simplified flowchart depicting a method of using a rotated trunk index to select an output port from multiple output ports associated with a trunk according to an embodiment of the present invention.

FIG. 7 depicts a simplified flowchart 700 depicting a method of using a rotated trunk index to select an output port from multiple output ports associated with a trunk according to an embodiment of the present invention. The method depicted in FIG. 7 and described below is illustrative of one embodiment of how a network device may use the rotated trunk index and is not intended to limit the scope of the embodiments of the present invention as recited in the claims. Other methods may be used in alternative embodiments. The processing depicted in FIG. 7 may be performed by packet processor 106 depicted in FIG. 1.

As depicted in FIG. 7, an index to an entry in the PRAM is obtained for the packet to be forwarded (step 702). In one embodiment, a section of the packet header is used to perform a lookup in the CAM. A matching entry in the CAM yields an index to an entry in the CAM2PRAM table. The CAM2PRAM table entry provides an index to an entry in the PRAM. In some embodiments, a CAM2PRAM table may not be used and a matching entry in the CAM may itself provide an index to an entry in the PRAM.

A trunk group identifier (TGID) and a PRAM forwarding identifier (PRAM FID) are then determined from the PRAM entry to which an index is obtained in 702 (step 704). In one implementation, the PRAM may be organized as a 32M×4 or 512K×64×4 memory. Each PRAM entry may include, for example, 247 bits of routing and status information, along with a 9-bit TGID (TRUNK_GROUP[8:0]), which indexes into a trunk group table. The TGID references the trunk to be used for forwarding the packet. PRAM entries sharing a trunk are programmed with the trunk's TGID.

In one embodiment, the trunk group table stores information for one or more trunks.

A trunk group table may store one or more entries corresponding to trunks and the entries are addressed by TGIDs stored in the PRAM entries. The information stored for each trunk may include information identifying the current number of active ports associated with the trunk. In one implementation, each trunk group table entry stores information for a trunk and comprises a value representing the number of currently active trunk ports for the trunk. In such an implementation, when the number of active member ports in a trunk changes, the information in the corresponding trunk group table entry is updated to reflect the change. In this manner, the information in the PRAM entries for the trunk does not have to be changed. PRAM entries sharing a trunk may be programmed with the trunk's TGID, which provides an index to an entry in the trunk group table storing information for that trunk. Updates to the trunk information are made in the trunk group table, rather than in the PRAM entries.

The TGID obtained in 704 is used to access an entry in the trunk group table (step 706). The number of active ports of the trunk is then determined from the trunk group table entry accessed in 706 (step 708). In one embodiment, a 4-bit number (TRUNK_PORTS[4:0]) represents a number from zero to the number of currently active member ports of the trunk minus one. Accordingly, TRUNK_PORTS[4:0] ranges from 0 to one less than the number of currently active member ports. Thus, an adjustment may be made in 708 by adding one to the TRUNK_PORTS to obtain the number of currently active ports as follows:

TRUNK_PORTS_ADJ[5:0]=TRUNK_PORTS[4:0]+5'h1
TRUNK_PORTS_ADJ represents the number of active trunk ports.

An output port for forwarding the packet is then determined from the multiple ports associated with the trunk based upon the number of ports determined in 708 and the rotated trunk index (step 710). In one embodiment, this is done by first determining a Trunk_Adjust value based upon the number of active trunk ports determined in 708 and the rotated trunk index previously generated (as generated in step 210 in FIG. 2). In one embodiment, the Trunk_Adjust value is determined as follows (assuming an 8-bit trunk index):

Trunk_Adjust[5:0]=Trunk Index[15:0] % TRUNK_PORTS_ADJ[5:0]

As shown above, a modulo operation is used to select one of the currently active ports of the trunk represented by Trunk_Adjust. A trunk_FID may then be obtained using the PRAM FID determined in 704 and the Trunk_Adjust. In one embodiment, a 16-bit trunk_FID is obtained using a bit-wise OR operation (|) as follows:

TRUNK_FID[15:0]=PRAM_FID[15:0]|Trunk_Adjust[4:0]

In one embodiment, the trunk_FID points to information related to the output port from the trunk to be used for forwarding the packet. Various other techniques may be used in alternative embodiments.

In embodiments wherein a path has to be determined from multiple paths available for forwarding the packet and the selected path is a trunk, then the processing depicted in FIGS. 6 and 7 may be performed to determine a particular ECMP path and a particular output port of the trunk for forwarding a packet.

As described above, embodiments of the present invention provide techniques for generating an index (rotated path index) for selecting a path from multiple paths that may be available for forwarding a packet and for generating an index (rotated trunk index) for selecting a port from multiple ports associated with a port. The manner in which the rotated indices are generated enhances the diversification in the selection of paths and/or trunk ports for forwarding a packet.

Embodiments of the present invention ensure that packets belonging to the same "flow" are forwarded using the same path and/or same trunk port. A "flow" may be characterized by information selected from a packet to be forwarded. For example, one or more fields selected from the header of a packet may define a flow. The definition of a flow may change from one environment to another. In one embodiment, a flow means a combination of the source and destination fields in the packet. In such an environment, two packets may be considered to belong to the same flow if they both have the same source address and destination address. For a given flow, as long as the region boundary (e.g., the number of ports configured) is fixed, the same next-hop will be chosen for packets belonging to the flow. This is useful for several networking protocol and applications. For example, for a connected TCP flow, diverting packets from the same flow to different paths/ports will introduce additional overhead due to path/port setup requirements which will degrade the performance of the network. As a result, embodiments of the present invention ensure that packets belonging to the same flow are forwarded using the same path and/or same trunk port.

Embodiments of the present invention may be used for various applications. For example, service providers and datacenters looking for ECMP and trunk diversification may use embodiments of the present invention. Embodiments of the present invention may be used in various different network topologies including single and multi-stage networks. Embodiments of the present invention provide improved diversification in the selection of paths and/or trunk ports and as a result provide improved data load balancing across paths and trunk ports in a network.

Figure 8:
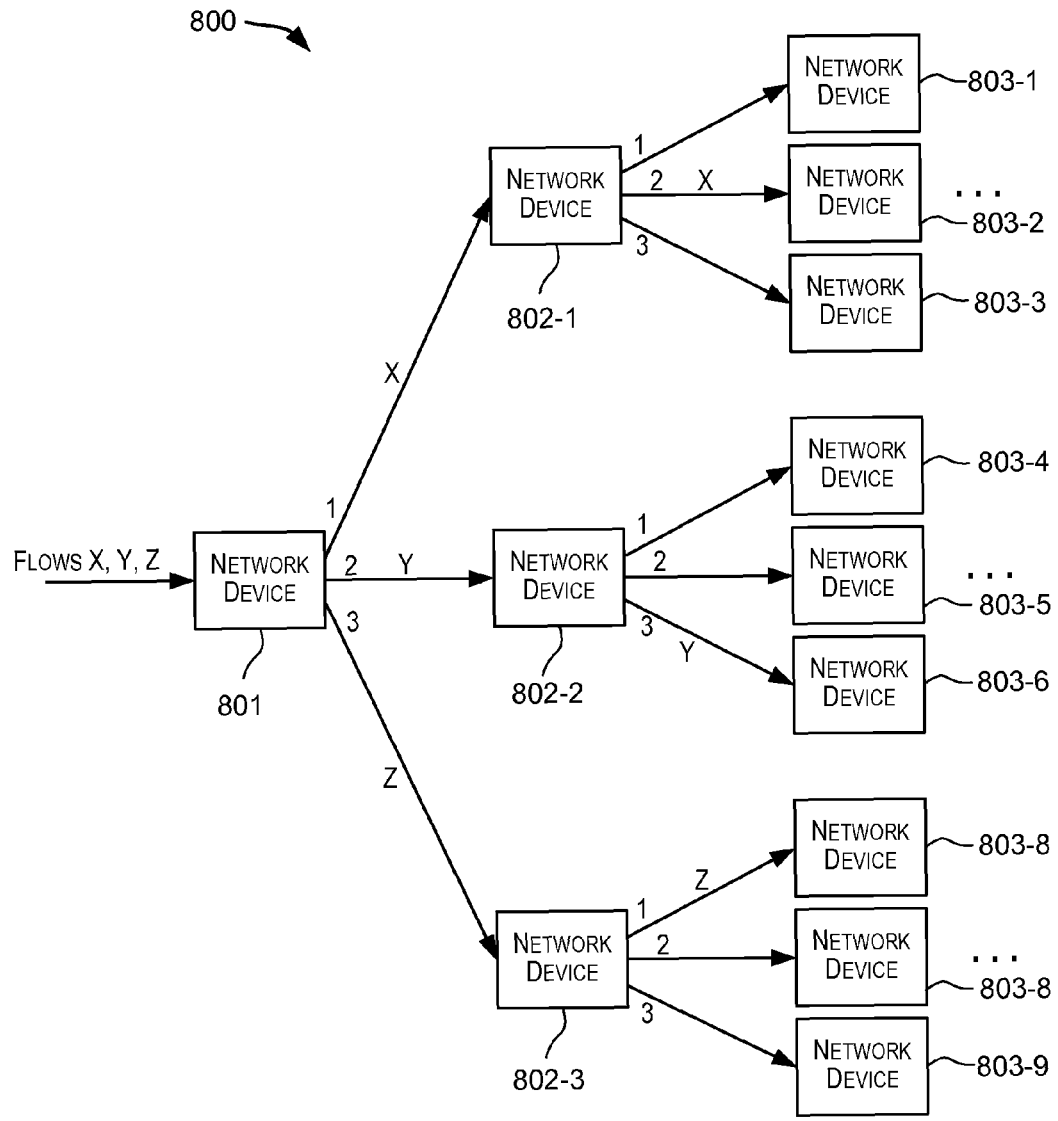
FIG. 8 depicts a multistage network that may incorporate an embodiment of the present invention.

FIG. 8 depicts a multistage network 800 that may incorporate an embodiment of the present invention. FIG. 8 depicts three stages of network 800, with network device 801 belonging to a first stage, network devices 802-1, 802-2, and 802-3 belonging to a second stage, and network devices 803-1 through 803-9 belonging to a third stage. Each network device may be configured to apply a preconfigured amount of rotation to generate a rotated path index and/or a rotated trunk index. The amount of rotation applied by one network device may be different from the amount of rotation applied by another network device. In this manner, different amounts of rotation may be applied by the network devices depicted in FIG. 8 (although they all do not have to be different) in generation of the rotated indices. In this manner, enhanced diversity in the selection of a path and/or a trunk port for data forwarding is provided.

As depicted in FIG. 8, network device 801 may receive packets belonging to multiple traffic flows, including packets belonging to flows X, Y, and Z. At network device 801, three ECMP paths (labeled 1, 2, and 3) may be available for forwarding the data flows to the next-hop. Using a rotated ECMP index generated as described above, network device 801 may select ECMP path 1 for packets belonging to flow X and forward the flow X packets along ECMP path 1 to network device 802-1. Using the same technique for generating a rotated ECMP index, network device 801 may select ECMP path 2 for packets belonging to flow Y and forward the flow Y packets along ECMP path 2 to network device 802-2. Using the same technique for generating a rotated ECMP index, network device 801 may select ECMP path 3 for packets belonging to flow Z and forward the flow Z packets along ECMP path 2 to network device 802-3. Further, all packets belonging to the same flow are forwarded along the same ECMP path.

Network device 802-1 may also provide three different possible ECMP paths for forwarding packets belonging to flow X. Based upon a rotated ECMP index generated by network device 802-1, network device 802-1 may select ECMP path 2 for forwarding packets belonging to flow X and forward the flow X packets along ECMP path 2 to network device 803-2.

Network device 802-2 may also provide three different possible ECMP paths for forwarding packets belonging to flow Y. Based upon a rotated ECMP index generated by network device 802-2, network device 802-1 may select ECMP path 3 for forwarding packets belonging to flow Y and forward the flow Y packets along ECMP path 3 to network device 803-6.

Network device 802-3 may also provide three different possible ECMP paths for forwarding packets belonging to flow Z. Based upon a rotated ECMP index generated by network device 802-3, network device 802-3 may select ECMP path 1 for forwarding packets belonging to flow Z and forward the flow Z packets along ECMP path 1 to network device 803-7.

As can be seen from the above example, the ECMP paths selected for forwarding a particular flow of packets at the different stages are different. This is because the amount of rotation applied by the network devices at the different stages may be different to generate different rotated ECMP indices thereby resulting in different ECMP paths being selected. For example, for packets belonging to flow X, at stage one, ECMP path 1 is selected, whereas, at stage two, ECMP path 2 is selected. This is due to the fact that the amount of rotation applied by network device 701 for generating a rotated path index or ECMP index may be different from the amount of rotation applied by network device 702-1. As a result, the rotated path index generated at network device 702 may be different from the rotated path index generated at network device 702-1. Due to this, a traffic flow may be diverted to different paths at different stages of the network while ensuring that, at a particular network device, all packets belonging to a particular traffic flow are all forwarded using the same path. This is different from conventional selection techniques, wherein the same path is likely to be selected at each network device for a traffic flow. Likewise, for packets belonging to flow Y, at stage one, ECMP path 2 is selected, whereas, at stage two, ECMP path 3 is selected. Further, for packets belonging to flow Z, at stage one, ECMP path 3 is selected, whereas, at stage two, ECMP path 1 is selected.

Accordingly, different ECMP paths may be selected at different stages, thereby enhancing the diversity of the selection, using the same technique for generating rotated path and trunk indices. Embodiments of the present invention may thus be used in a multistage network to enhance diversity in the selection of paths at the different stages.

If the selected path is a trunk, then the trunk index may be used to select a particular port from the multiple ports associated with the trunk for forwarding the packet. As with the selection of paths, the selected port for a particular flow of traffic may be different at different stages of the network since the amount of rotation applied by the network devices at the different stages for generating rotated trunk indices may be different at the different network devices resulting in different rotated trunk indices being generated at the different network devices.

Although specific embodiments of the invention have been described, various modifications, alterations, alternative constructions, and equivalents are also encompassed within the scope of the invention. For example, while embodiments have been described for using a rotated path index to select an ECMP path from multiple ECMP paths, the path index may also be used to select other types of paths. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. For example, while embodiments of the present invention have been described for selecting ECMP paths, in other embodiments, the techniques described above may also be used to select a path from multiple path choices for forwarding a packet.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method comprising:
    generating, at a first network device, a first value based upon one or more sections of a first packet;
    bit rotating, at the first network device, the first value by a first amount to generate a first rotated index, wherein the first amount is specified by a first control variable that is configured for the first network device, and wherein the first rotated index is used to select a path from a plurality of paths for forwarding the first packet from the first network device;
    generating, at the first network device, a second value based upon one or more sections of a second packet; and
    bit rotating, at the first network device, the second value by a second amount to generate a second rotated index, wherein the second amount is specified by a second control variable that is configured for the network device and is distinct from the first control variable, and wherein the second rotated index is used to select a port from a plurality of ports associated with a trunk for forwarding the second packet from the first network device.

2. The method of claim 1 wherein generating the first value comprises:
    hashing the one or more sections of the first packet to generate a hash value; and
    generating the first value using the hash value.

3. The method of claim 1 further comprising:
    communicating the first packet from the first network device to a second network device using the selected path;
    generating, at the second network device, a third value based upon the one or more sections of the first packet;
    bit rotating, at the second network device, the third value by a third amount to generate a third rotated index, wherein the third amount is specified by a third control variable configured for the second network device, and wherein the third amount specified by the third control variable is different from the first amount specified by the first control variable; and
    selecting, at the second network device, a path from a plurality of paths for forwarding the first packet from the second network device based upon the third rotated index.

4. The method of claim 1 wherein the control variable is configurable by a user.

5. A network device comprising:
    a plurality of ports; and
    a packet processor configured to
        generate a first value based upon one or more sections of a first packet to be forwarded from the network device,
        bit rotate the first value by a first amount to generate a first rotated index, wherein the first amount is specified by a first control variable that is configured for the network device, and wherein the first rotated index is used to select a path from a plurality of paths for forwarding the first packet from the first network device;
        generate a second value based upon one or more sections of a second packet to be forwarded from the network device; and
        bit rotate the second value by a second amount to generate a second rotated index, wherein the second amount is specified by a second control variable that is configured for the network device and is distinct from the first control variable, and wherein the second rotated index is used to select a port from a plurality of ports associated with a trunk for forwarding the second packet from the first network device.

6. The network device of claim 5 wherein the packet processor is configured to:
    hash the one or more sections of the first packet to generate a hash value; and
    generate the first value using the hash value.

7. The network device of claim 5 further configured to:
    communicate the first packet from the network device to a second network device using the selected path;
    wherein the second network device is configured to apply a different amount of rotation from the first amount for generating a third rotated index that is used to select a path for forwarding the first packet from the second network device.

8. The network device of claim 5 wherein the control variable is configurable by a user.

9. A network device comprising:
    means for generating a first value based upon one or more sections of a first packet;
    means for bit rotating the first value by a first amount to generate a first rotated index, wherein the first amount is specified by a first control variable that is configured for the first network device, and wherein the first rotated index is used to select a path from a plurality of paths for forwarding the first packet from the network device;
    means for generating a second value based upon one or more sections of a second packet; and
    means for bit rotating the second value by a second amount to generate a second rotated index, wherein the second amount is specified by a second control variable that is configured for the network device and is distinct from the first control variable, and wherein the second rotated index is used to select a port from a plurality of ports associated with a trunk for forwarding the second packet from the network device.

10. The network device of claim 9 further comprising:
    means for hashing the one or more sections of the first packet to generate a hash value; and
    means for generating the first value using the hash value.

11. The network device of claim 9 further comprising:
means for communicating the first packet from the network device to a second network device using the selected path;
wherein the second network device is configured to apply a different amount of rotation from the first amount for generating a third rotated index that is used to select a path for forwarding the first packet from the second network device.

* * * * *